(12) United States Patent
Joseph et al.

(10) Patent No.: US 12,160,334 B2
(45) Date of Patent: *Dec. 3, 2024

(54) SELF-ADAPTING AUTONOMOUS TRANSMISSION CONFIGURATION

(71) Applicant: QUALCOMM Incorporated, San Diego, CA (US)

(72) Inventors: Vinay Joseph, Calicut (IN); Piyush Gupta, Bridgewater, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/190,581

(22) Filed: Mar. 27, 2023

(65) Prior Publication Data

US 2023/0231751 A1 Jul. 20, 2023

Related U.S. Application Data

(63) Continuation of application No. 16/550,925, filed on Aug. 26, 2019, now Pat. No. 11,627,025.

(Continued)

(51) Int. Cl.
*H04L 27/26* (2006.01)
*H04L 41/0896* (2022.01)
(Continued)

(52) U.S. Cl.
CPC ...... *H04L 27/2601* (2013.01); *H04L 41/0896* (2013.01); *H04W 28/10* (2013.01); *H04W 72/23* (2023.01); *H04W 72/0446* (2013.01)

(58) Field of Classification Search
CPC ............. H04L 27/2601; H04L 41/0896; H04L 5/0053; H04L 41/0886; H04L 1/18;
(Continued)

(56) References Cited

U.S. PATENT DOCUMENTS

2019/0098657 A1 3/2019 Golitschek Edler Von Elbwart
2019/0342911 A1 11/2019 Talarico et al.
(Continued)

FOREIGN PATENT DOCUMENTS

WO 2018103002 A1 6/2018
WO 2019156767 A1 8/2019

OTHER PUBLICATIONS

International Preliminary Report on Patentability—PCT/US2019/048273 The International Bureau of WIPO—Geneva, Switzerland, Mar. 18, 2021 (184828WO).
(Continued)

*Primary Examiner* — Jung H Park
(74) *Attorney, Agent, or Firm* — HHolland & Hart LLP/Qualcomm Incorporated

(57) ABSTRACT

Methods, systems, and devices for wireless communications are described. Autonomous transmissions between a user equipment (UE) and a base station may be configured that include at least one of a modulation and coding scheme (MCS) or resources for the transmissions. In some cases, a trigger may be detected that changes the MCS or resources to be used for the autonomous transmissions. The trigger may include the presence or absence of retransmissions or the value of a channel measurement falling below or exceeding a threshold value. Accordingly, the base station and UE may adjust the MCS or resources to be used for the autonomous transmissions based on detecting the trigger and then communicate using the adjusted MCS or resources. In some cases, the configuration for the autonomous transmissions may be signaled via a medium access control (MAC) control element (CE).

20 Claims, 21 Drawing Sheets

Related U.S. Application Data

(60) Provisional application No. 62/726,870, filed on Sep. 4, 2018.

(51) Int. Cl.
   *H04W 28/10* (2009.01)
   *H04W 72/0446* (2023.01)
   *H04W 72/23* (2023.01)

(58) Field of Classification Search
   CPC ............... H04L 5/0091; H04L 27/2614; H04L 27/2636; H04L 1/0032; H04L 1/0025; H04L 1/0003; H04W 28/0289; H04W 72/23; H04W 72/0446; H04W 72/02

See application file for complete search history.

(56) References Cited

U.S. PATENT DOCUMENTS

| | | | |
|---|---|---|---|
| 2020/0037359 A1* | 1/2020 | Wang | H04L 1/1812 |
| 2020/0076657 A1 | 3/2020 | Joseph et al. | |
| 2020/0296749 A1* | 9/2020 | Freda | H04W 28/0268 |

OTHER PUBLICATIONS

International Search Report and Written Opinion—PCT/US2019/048273—ISA/EPO—Jan. 28, 2020 (184828WO).

Lenovo, et al., "HARQ and Control Signalling for Autonomous Uplink", 3GPP Draft; R1-1718300, 3rd Generation Partnership Project (3GPP), Mobile Competence Centre ; 650, Route Des Lucioles; F-06921 Sophia-Antipolis Cedex; France, vol. RAN WG1, No. Prague, Czech Republic; Oct. 9-13, 2017, Sep. 29, 2017 (Sep. 29, 2017), XP051351679, 3 Pages, section 2.3.

Partial International Search Report—PCT/US2019/048273—ISA/EPO—Nov. 25, 2019 (184828WO).

* cited by examiner

SELF-ADAPTING AUTONOMOUS TRANSMISSION CONFIGURATION

CROSS REFERENCE

The present Application for Patent is a continuation of U.S. patent application Ser. No. 16/550,925 by JOSEPH, et al., entitled "SELF-ADAPTING AUTONOMOUS TRANSMISSION CONFIGURATION," filed Aug. 26, 2019, now granted U.S. Pat. No. 11,627,025 issued on Apr. 11, 2023, which claims the benefit of U.S. Provisional Patent Application No. 62/726,870 by JOSEPH, et al., entitled "SELF-ADAPTING AUTONOMOUS TRANSMISSION CONFIGURATION," filed Sep. 4, 2018, each of which is assigned to the assignee hereof and incorporated by reference in its entirety.

BACKGROUND

The following relates generally to wireless communications, and more specifically to self-adapting autonomous transmission configuration.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, traffic may be transmitted between a base station and a UE based on a periodic schedule. Accordingly, the base station may transmit information in a downlink control channel to the UE to indicate upcoming downlink traffic or to indicate resources for upcoming uplink traffic according to the periodic schedule. Transmitting this scheduling information each time the periodic traffic is identified may increase signaling overhead for the base station and UE (e.g., increased latency, overhead power consumption at the UE, etc.). To reduce the signaling overhead, the base station may transmit a configuration for autonomous transmissions (e.g., a semi-persistent scheduling (SPS) configuration) to the UE that allocates resources occurring periodically to be used autonomously for the periodic schedule and traffic. However, the base station may base the autonomous transmission configuration on imperfect channel knowledge, resulting in a conservative or aggressive configuration with respect to a configuration needed for the autonomous transmissions. In some cases, the base station may update the autonomous transmission configuration to mitigate the conservative or aggressive configuration via an additional downlink control channel, counteracting the reduced signal overhead afforded by the autonomous transmission configuration. Efficient techniques are desired for configuring autonomous transmissions while reducing signaling overhead.

SUMMARY

The described techniques relate to improved methods, systems, devices, and apparatuses that support a self-adapting autonomous transmission configuration. Generally, the described techniques provide for configuring autonomous uplink transmissions from a user equipment (UE) to a base station or autonomous downlink transmissions from the base station to the UE that include at least one of a modulation and coding scheme (MCS) or resources for the autonomous uplink or the autonomous downlink transmissions. In some cases, the UE and/or the base station may detect a trigger that changes the MCS or resources (e.g., resource blocks (RBs)) to be used for the autonomous uplink transmissions and/or the autonomous downlink transmissions. The trigger may include the presence or absence of one or more retransmissions, the value of a channel measurement in relation to a threshold value, or a combination thereof. Accordingly, the MCS or resources to be used for the autonomous uplink transmissions and/or the autonomous downlink transmissions may be adjusted based on detecting the trigger. In some cases, adjusting the MCS or resources may include increasing or decreasing the MCS or number of resources based on the trigger. The UE and the base station may then communicate using the adjusted MCS or resources. Additionally or alternatively, the base station may signal the configurations for the autonomous uplink and/or downlink transmissions via a medium access control (MAC) control element (CE) that includes an indication of a set of resources, a time offset, a periodicity, an MCS for the transmissions, or a combination thereof. The MAC CE or a downlink control information (DCI) message may then activate the configuration after the configuration has been signaled.

A method of wireless communication at a UE is described. The method may include receiving, from a base station, a configuration that includes at least one of an MCS or resources for autonomous uplink transmissions from the UE to the base station or autonomous downlink transmissions from the base station to the UE, detecting an occurrence of a trigger event for triggering a change in the MCS or resources to be used for transmitting the autonomous uplink transmissions or for monitoring the autonomous downlink transmissions, adjusting the MCS or resources to be used for transmitting the autonomous uplink transmissions or for monitoring the autonomous downlink transmissions in accordance with the configuration and based on the occurrence of the trigger event, and communicating with the base station using the adjusted MCS or resources.

An apparatus for wireless communication at a UE is described. The apparatus may include a processor, memory in electronic communication with the processor, and instructions stored in the memory. The instructions may be executable by the processor to cause the apparatus to receive, from a base station, a configuration that includes at least one of an MCS or resources for autonomous uplink transmissions from the UE to the base station or autonomous downlink transmissions from the base station to the UE, detect an occurrence of a trigger event for triggering a change in the MCS or resources to be used for transmitting the autonomous uplink transmissions or for monitoring the autonomous downlink transmissions, adjust the MCS or resources to be used for transmitting the autonomous uplink transmissions or for monitoring the autonomous downlink transmissions in accordance with the configuration and based on the occurrence of the trigger event, and communicate with the base station using the adjusted MCS or resources.

Another apparatus for wireless communication at a UE is described. The apparatus may include means for receiving, from a base station, a configuration that includes at least one of an MCS or resources for autonomous uplink transmissions from the UE to the base station or autonomous downlink transmissions from the base station to the UE, detecting an occurrence of a trigger event for triggering a change in the MCS or resources to be used for transmitting the autonomous uplink transmissions or for monitoring the autonomous downlink transmissions, adjusting the MCS or resources to be used for transmitting the autonomous uplink transmissions or for monitoring the autonomous downlink transmissions in accordance with the configuration and based on the occurrence of the trigger event, and communicating with the base station using the adjusted MCS or resources.

A non-transitory computer-readable medium storing code for wireless communication at a UE is described. The code may include instructions executable by a processor to receive, from a base station, a configuration that includes at least one of an MCS or resources for autonomous uplink transmissions from the UE to the base station or autonomous downlink transmissions from the base station to the UE, detect an occurrence of a trigger event for triggering a change in the MCS or resources to be used for transmitting the autonomous uplink transmissions or for monitoring the autonomous downlink transmissions, adjust the MCS or resources to be used for transmitting the autonomous uplink transmissions or for monitoring the autonomous downlink transmissions in accordance with the configuration and based on the occurrence of the trigger event, and communicate with the base station using the adjusted MCS or resources.

In some examples of the method, apparatuses, and non-transitory computer-readable medium described herein, receiving the configuration may include operations, features, means, or instructions for receiving an indication of the trigger event in the configuration.

In some examples of the method, apparatuses, and non-transitory computer-readable medium described herein, adjusting the MCS or resources to be used for transmitting the autonomous uplink transmissions or for monitoring the autonomous downlink transmissions may include operations, features, means, or instructions for autonomously decreasing the MCS or increasing the resources to be used for transmitting the autonomous uplink transmissions or for monitoring the autonomous downlink transmissions.

In some examples of the method, apparatuses, and non-transitory computer-readable medium described herein, detecting the occurrence of the trigger event may include operations, features, means, or instructions for identifying that a retransmission of an autonomous uplink transmission or an autonomous downlink transmission occurred.

In some examples of the method, apparatuses, and non-transitory computer-readable medium described herein, detecting the occurrence of the trigger event may include operations, features, means, or instructions for identifying that a specific retransmission of an autonomous uplink transmission or an autonomous downlink transmission occurred.

In some examples of the method, apparatuses, and non-transitory computer-readable medium described herein, detecting the occurrence of the trigger event may include operations, features, means, or instructions for identifying that a retransmission of an autonomous uplink transmission or an autonomous downlink transmission occurred during a specific window of time.

In some examples of the method, apparatuses, and non-transitory computer-readable medium described herein, the specific window of time may be associated with a specific time duration beginning at a time of a slot on which a DCI message activating the autonomous uplink transmissions or autonomous downlink transmissions may be received.

In some examples of the method, apparatuses, and non-transitory computer-readable medium described herein, detecting the occurrence of the trigger event may include operations, features, means, or instructions for identifying that a channel state information (CSI) measurement or a radio resource control (RRC) measurement reported to the base station may be below a threshold, where the threshold includes a predetermined threshold value or a threshold value indicated in the configuration.

In some examples of the method, apparatuses, and non-transitory computer-readable medium described herein, adjusting the MCS or resources to be used for transmitting the autonomous uplink transmissions or for monitoring the autonomous downlink transmissions may include operations, features, means, or instructions for autonomously increasing the MCS or decreasing the resources to be used for transmitting the autonomous uplink transmissions or for monitoring the autonomous downlink transmissions.

In some examples of the method, apparatuses, and non-transitory computer-readable medium described herein, detecting the occurrence of the trigger event may include operations, features, means, or instructions for identifying that a specific retransmission of an autonomous uplink transmission or an autonomous downlink transmission did not occur.

In some examples of the method, apparatuses, and non-transitory computer-readable medium described herein, detecting the occurrence of the trigger event may include operations, features, means, or instructions for identifying that a retransmission of an autonomous uplink transmission or an autonomous downlink transmission did not occur during a specific window of time.

In some examples of the method, apparatuses, and non-transitory computer-readable medium described herein, the specific window of time may be associated with a specific number of slots beginning with a slot on which a DCI message activating the autonomous uplink transmissions or autonomous downlink transmissions may be received.

In some examples of the method, apparatuses, and non-transitory computer-readable medium described herein, detecting the occurrence of the trigger event may include operations, features, means, or instructions for identifying that a CSI measurement or an RRC measurement reported to the base station may be above a predetermined threshold.

Some examples of the method, apparatuses, and non-transitory computer-readable medium described herein may further include operations, features, means, or instructions for receiving a DCI message activating the temporary configuration as a temporary replacement to a baseline configuration, where the temporary configuration and the baseline configuration may be separately configured and activated.

In some examples of the method, apparatuses, and non-transitory computer-readable medium described herein, receiving the configuration may include operations, features, means, or instructions for receiving at least a portion of the configuration via a MAC CE.

Some examples of the method, apparatuses, and non-transitory computer-readable medium described herein may further include operations, features, means, or instructions for activating the configuration upon reception of the MAC CE.

Some examples of the method, apparatuses, and non-transitory computer-readable medium described herein may further include operations, features, means, or instructions for receiving a DCI message subsequent to reception of the MAC CE and activating the configuration upon reception of the DCI message.

In some examples of the method, apparatuses, and non-transitory computer-readable medium described herein, the trigger event may be included in the MAC CE, and portions of the configuration may be included in both the MAC CE and the DCI message.

A method of wireless communication at a base station is described. The method may include transmitting, to a UE, a configuration that includes at least one of a MCS or resources for autonomous uplink transmissions from the UE to the base station or autonomous downlink transmissions from the base station to the UE, detecting an occurrence of a trigger event for triggering a change in the MCS or resources to be used for transmitting the autonomous downlink transmissions or for monitoring the autonomous uplink transmissions, adjusting the MCS or resources to be used for transmitting the autonomous downlink transmissions or for monitoring the autonomous uplink transmissions in accordance with the configuration and based on the occurrence of the trigger event without informing the UE, and communicating with the UE using the adjusted MCS or resources.

An apparatus for wireless communication at a base station is described. The apparatus may include a processor, memory in electronic communication with the processor, and instructions stored in the memory. The instructions may be executable by the processor to cause the apparatus to transmit, to a UE, a configuration that includes at least one of a MCS or resources for autonomous uplink transmissions from the UE to the base station or autonomous downlink transmissions from the base station to the UE, detect an occurrence of a trigger event for triggering a change in the MCS or resources to be used for transmitting the autonomous downlink transmissions or for monitoring the autonomous uplink transmissions, adjust the MCS or resources to be used for transmitting the autonomous downlink transmissions or for monitoring the autonomous uplink transmissions in accordance with the configuration and based on the occurrence of the trigger event without informing the UE, and communicate with the UE using the adjusted MCS or resources.

Another apparatus for wireless communication at a base station is described. The apparatus may include means for transmitting, to a UE, a configuration that includes at least one of a MCS or resources for autonomous uplink transmissions from the UE to the base station or autonomous downlink transmissions from the base station to the UE, detecting an occurrence of a trigger event for triggering a change in the MCS or resources to be used for transmitting the autonomous downlink transmissions or for monitoring the autonomous uplink transmissions, adjusting the MCS or resources to be used for transmitting the autonomous downlink transmissions or for monitoring the autonomous uplink transmissions in accordance with the configuration and based on the occurrence of the trigger event without informing the UE, and communicating with the UE using the adjusted MCS or resources.

A non-transitory computer-readable medium storing code for wireless communication at a base station is described. The code may include instructions executable by a processor to transmit, to a UE, a configuration that includes at least one of a MCS or resources for autonomous uplink transmissions from the UE to the base station or autonomous downlink transmissions from the base station to the UE, detect an occurrence of a trigger event for triggering a change in the MCS or resources to be used for transmitting the autonomous downlink transmissions or for monitoring the autonomous uplink transmissions, adjust the MCS or resources to be used for transmitting the autonomous downlink transmissions or for monitoring the autonomous uplink transmissions in accordance with the configuration and based on the occurrence of the trigger event without informing the UE, and communicate with the UE using the adjusted MCS or resources.

In some examples of the method, apparatuses, and non-transitory computer-readable medium described herein, transmitting the configuration may include operations, features, means, or instructions for transmitting an indication of the trigger event in the configuration.

In some examples of the method, apparatuses, and non-transitory computer-readable medium described herein, adjusting the MCS or resources to be used for transmitting the autonomous downlink transmissions or for monitoring the autonomous uplink transmissions may include operations, features, means, or instructions for autonomously decreasing the MCS or increasing the resources to be used for transmitting the autonomous downlink transmissions or for monitoring the autonomous uplink transmissions without informing the UE.

In some examples of the method, apparatuses, and non-transitory computer-readable medium described herein, detecting the occurrence of the trigger event may include operations, features, means, or instructions for identifying that a retransmission of an autonomous uplink transmission or an autonomous downlink transmission occurred.

In some examples of the method, apparatuses, and non-transitory computer-readable medium described herein, detecting the occurrence of the trigger event may include operations, features, means, or instructions for identifying that a specific retransmission of an autonomous uplink transmission or an autonomous downlink transmission occurred.

In some examples of the method, apparatuses, and non-transitory computer-readable medium described herein, detecting the occurrence of the trigger event may include operations, features, means, or instructions for identifying that a retransmission of an autonomous uplink transmission or an autonomous downlink transmission occurred during a specific window of time.

In some examples of the method, apparatuses, and non-transitory computer-readable medium described herein, the specific window of time may be associated with a specific time duration beginning at a time of a slot on which a DCI message activating the autonomous uplink transmissions or autonomous downlink transmissions may be transmitted.

In some examples of the method, apparatuses, and non-transitory computer-readable medium described herein, detecting the occurrence of the trigger event may include operations, features, means, or instructions for identifying that a CSI measurement or an RRC measurement reported from the UE may be below a predetermined threshold.

In some examples of the method, apparatuses, and non-transitory computer-readable medium described herein, adjusting the MCS or resources to be used for transmitting the autonomous downlink transmissions or for monitoring the autonomous uplink transmissions may include operations, features, means, or instructions for autonomously increasing the MCS or decreasing the resources to be used for transmitting the autonomous downlink transmissions or for monitoring the autonomous uplink transmissions without informing the UE.

In some examples of the method, apparatuses, and non-transitory computer-readable medium described herein, detecting the occurrence of the trigger event may include operations, features, means, or instructions for identifying that a specific retransmission of an autonomous uplink transmission or an autonomous downlink transmission did not occur.

In some examples of the method, apparatuses, and non-transitory computer-readable medium described herein, detecting the occurrence of the trigger event may include operations, features, means, or instructions for identifying that a retransmission of an autonomous uplink transmission or an autonomous downlink transmission did not occur during a specific window of time.

In some examples of the method, apparatuses, and non-transitory computer-readable medium described herein, the specific window of time may be associated with a specific number of slots beginning with a slot on which a DCI message activating the autonomous uplink transmissions or autonomous downlink transmissions may be transmitted.

In some examples of the method, apparatuses, and non-transitory computer-readable medium described herein, detecting the occurrence of the trigger event may include operations, features, means, or instructions for identifying that a CSI measurement or an RRC measurement reported from the UE may be above a threshold, where the threshold includes a predetermined threshold value or a threshold value indicated in the configuration.

Some examples of the method, apparatuses, and non-transitory computer-readable medium described herein may further include operations, features, means, or instructions for transmitting a DCI message activating the temporary configuration as a temporary replacement to a baseline configuration, where the temporary configuration and the baseline configuration may be separately configured and activated.

In some examples of the method, apparatuses, and non-transitory computer-readable medium described herein, transmitting the configuration may include operations, features, means, or instructions for transmitting at least a portion of the configuration via a MAC CE.

Some examples of the method, apparatuses, and non-transitory computer-readable medium described herein may further include operations, features, means, or instructions for activating the configuration upon transmission of the MAC CE.

Some examples of the method, apparatuses, and non-transitory computer-readable medium described herein may further include operations, features, means, or instructions for transmitting a DCI message subsequent to transmission of the MAC CE and activating the configuration upon transmission of the DCI message.

In some examples of the method, apparatuses, and non-transitory computer-readable medium described herein, the trigger event may be included in the MAC CE, and portions of the configuration may be included in both the MAC CE and the DCI message.

A method of wireless communication at a UE is described. The method may include receiving, from a base station, a configuration for autonomous uplink transmissions from the UE to the base station or autonomous downlink transmissions from the base station to the UE, where the configuration is received via a MAC CE and includes one or more of an indication of a set of RBs, a time offset, a periodicity, and an MCS, and communicating with the base station in accordance with the configuration.

An apparatus for wireless communication at a UE is described. The apparatus may include a processor, memory in electronic communication with the processor, and instructions stored in the memory. The instructions may be executable by the processor to cause the apparatus to receive, from a base station, a configuration for autonomous uplink transmissions from the UE to the base station or autonomous downlink transmissions from the base station to the UE, where the configuration is received via a MAC CE and includes one or more of an indication of a set of RBs, a time offset, a periodicity, and an MCS, and communicate with the base station in accordance with the configuration.

Another apparatus for wireless communication at a UE is described. The apparatus may include means for receiving, from a base station, a configuration for autonomous uplink transmissions from the UE to the base station or autonomous downlink transmissions from the base station to the UE, where the configuration is received via a MAC CE and includes one or more of an indication of a set of RBs, a time offset, a periodicity, and an MCS, and communicating with the base station in accordance with the configuration.

A non-transitory computer-readable medium storing code for wireless communication at a UE is described. The code may include instructions executable by a processor to receive, from a base station, a configuration for autonomous uplink transmissions from the UE to the base station or autonomous downlink transmissions from the base station to the UE, where the configuration is received via a MAC CE and includes one or more of an indication of a set of RBs, a time offset, a periodicity, and an MCS, and communicate with the base station in accordance with the configuration.

Some examples of the method, apparatuses, and non-transitory computer-readable medium described herein may further include operations, features, means, or instructions for activating the configuration upon reception of the MAC CE.

Some examples of the method, apparatuses, and non-transitory computer-readable medium described herein may further include operations, features, means, or instructions for receiving a DCI message subsequent to reception of the MAC CE and activating the configuration upon reception of the DCI message.

A method of wireless communication at a base station is described. The method may include transmitting, to a UE, a configuration for autonomous uplink transmissions from the UE to the base station or autonomous downlink transmissions from the base station to the UE, where the configuration is transmitted via a MAC CE and includes one or more of an indication of a set of RBs, a time offset, a periodicity, and an MCS, and communicating with the UE in accordance with the configuration.

An apparatus for wireless communication at a base station is described. The apparatus may include a processor, memory in electronic communication with the processor, and instructions stored in the memory. The instructions may be executable by the processor to cause the apparatus to transmit, to a UE, a configuration for autonomous uplink transmissions from the UE to the base station or autonomous downlink transmissions from the base station to the UE, where the configuration is transmitted via a MAC CE and includes one or more of an indication of a set of RBs, a time offset, a periodicity, and an MCS, and communicate with the UE in accordance with the configuration.

Another apparatus for wireless communication at a base station is described. The apparatus may include means for transmitting, to a UE, a configuration for autonomous uplink transmissions from the UE to the base station or autonomous downlink transmissions from the base station to the UE, where the configuration is transmitted via a MAC CE and includes one or more of an indication of a set of RBs, a time offset, a periodicity, and an MCS, and communicating with the UE in accordance with the configuration.

A non-transitory computer-readable medium storing code for wireless communication at a base station is described. The code may include instructions executable by a processor to transmit, to a UE, a configuration for autonomous uplink transmissions from the UE to the base station or autonomous downlink transmissions from the base station to the UE, where the configuration is transmitted via a MAC CE and includes one or more of an indication of a set of RBs, a time offset, a periodicity, and an MCS, and communicate with the UE in accordance with the configuration.

Some examples of the method, apparatuses, and non-transitory computer-readable medium described herein may further include operations, features, means, or instructions for activating the configuration upon transmission of the MAC CE.

Some examples of the method, apparatuses, and non-transitory computer-readable medium described herein may further include operations, features, means, or instructions for transmitting a DCI message subsequent to transmission of the MAC CE and activating the configuration upon transmission of the DCI message.

DETAILED DESCRIPTION

Figure 1:
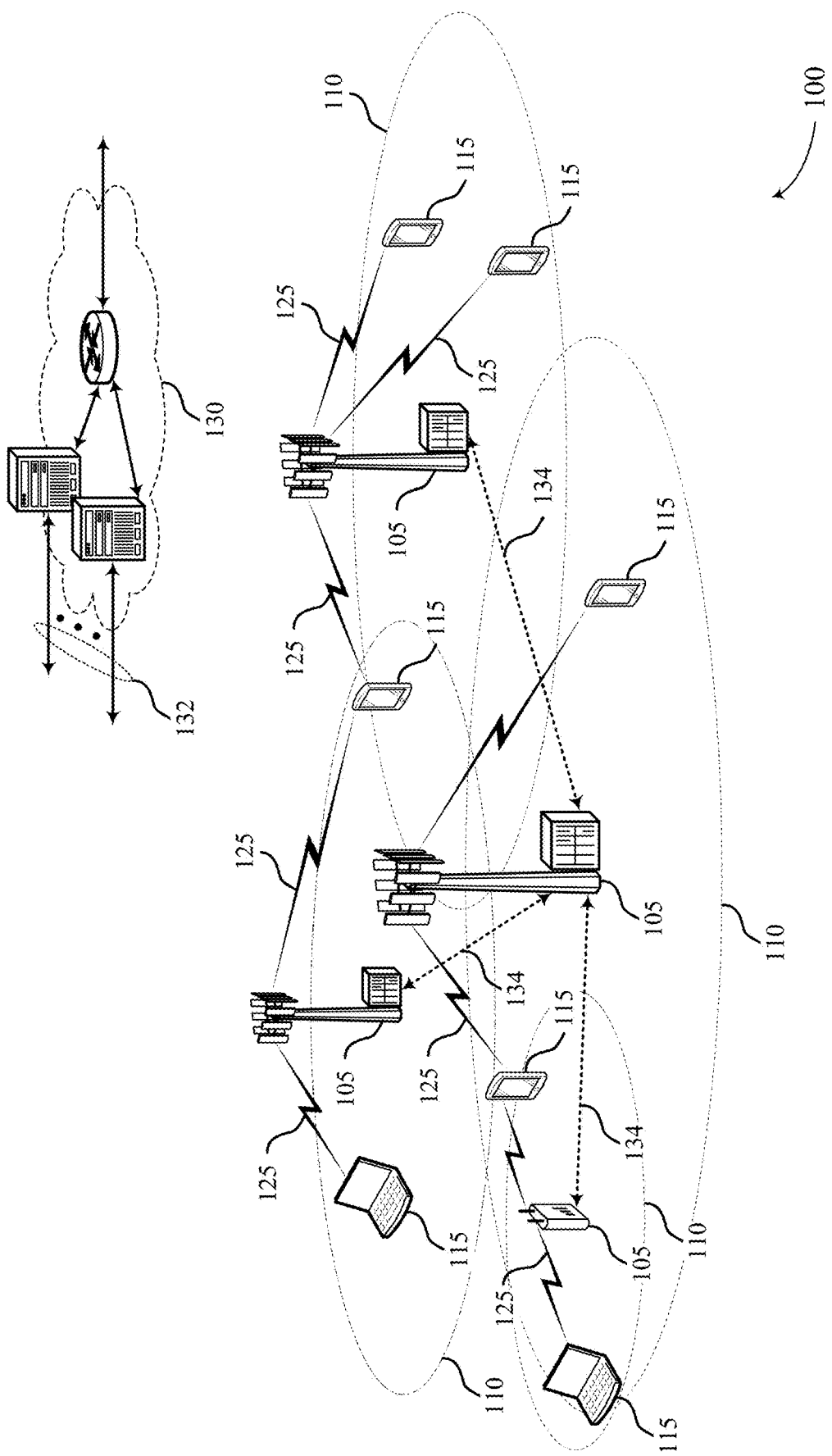
FIG. 1 illustrates an example of a system for wireless communications that supports a self-adapting autonomous transmission configuration in accordance with aspects of the present disclosure.

In some wireless communications systems, a base station and a user equipment (UE) may communicate periodically. For example, for ultra-reliable low latency communication (URLLC) services, factory automation may involve carrying periodic traffic between a programmable logic controller (PLC) (e.g., a base station) and a sensor-plus-actuator (S/A) (e.g., a UE). Rather than sending dynamic grants each time the periodic traffic is present, which may include large signaling overhead, the base station may configure a semi-persistent scheduling (SPS), configured scheduling (CS), or a configured grant (CG) scheme (e.g., an autonomous transmission configuration) to schedule resources semi-statically that may be used for the periodic traffic. However, this autonomous transmission configuration may be based on imperfect knowledge about channel conditions for the scheduled resources, leading to a conservative configuration (e.g., too many resources, underestimated code rate, etc.) or an aggressive configuration (e.g., too few resources, overestimated code rate, etc.). For example, the imperfect knowledge about channel conditions may arise when there is not enough time for obtaining more accurate knowledge about the channel conditions (e.g., based on the channel degrading too quickly for communications between the UE and the base station). In some cases, the base station may transmit an updated configuration on a downlink control channel to mitigate the conservative or aggressive configuration, but transmitting the updated configuration may further increase signaling overhead. To prevent the inefficient configurations while maintaining minimal signaling overhead, the autonomous transmission configuration may include a configuration for self-adaptation, where the autonomous transmission configuration may be adapted without additional UE-network signaling.

In some cases, the self-adapting configuration may enable the base station and/or UE to adjust a number of resources allocated for the autonomous transmission configuration or adjust the data rate (e.g., modulation and coding scheme (MCS)) by a configured amount based on an identified trigger. For example, one or more first triggers may cause the base station and the UE to increase the number of resources allocated for the autonomous transmission configuration, decrease the data rate for the autonomous transmission configuration, or a combination thereof without the base station signaling the adjustment to the UE. These one or more first triggers may include the occurrence of a specific retransmission, the occurrence of multiple retransmissions, a channel measurement falling below a threshold, or a combination thereof. Additionally or alternatively, one or more second triggers may cause the base station and the UE to decrease the number of resources allocated for the autonomous transmission configuration, increase the data rate for the autonomous transmission configuration, or a combination thereof. These one or more second triggers may include the absence or non-occurrence of a specific retransmission, the absence or non-occurrence of retransmissions during a specified time window, a channel measurement being above a threshold, or a combination thereof. In some cases, the autonomous transmission configuration may include a non-self-adapting configuration (e.g., a baseline configuration) and a self-adapting configuration (e.g., temporary or boost configuration), where the base station and the UE switch between the configurations based on activation and deactivation triggers. The self-adapting configuration may require fewer downlink control transmissions even with imperfect channel knowledge, and, thus, a lesser downlink control channel capacity may be supported.

Additionally, the base station may indicate the autonomous transmission configuration to the UE through a medium access control (MAC) control element (CE), where the autonomous transmission configuration may be self-adapting or non-self-adapting. The MAC CE may be signaled faster than other types of configuration signaling, reducing the latency for configuring the resources for the autonomous transmissions. Additionally, the autonomous transmission configuration may include an indication of a set of resources, a time offset, a periodicity, a data rate, or a combination thereof for the autonomous transmission configuration. In some cases, the autonomous transmission configuration may also be activated using a MAC CE (e.g., the same MAC CE that indicates the configuration or an additional MAC CE). Alternatively, the MAC CE that configures the autonomous transmissions may be coupled with a downlink control information (DCI) message, where the DCI message activates the autonomous transmission configuration. As described above, the autonomous transmission configuration activated by the DCI message may include a self-adapting configuration that adjusts the autonomous transmission configuration based on an identified trigger. The MAC CE may allow for a flexible and fast autonomous transmission configuration without having to modify existing DCI design.

Aspects of the disclosure are initially described in the context of a wireless communications system. An additional wireless communications system, examples of an autonomous transmission configuration activation, a periodic traffic transmission, and process flows are then provided to describe aspects of the disclosure. Aspects of the disclosure are further illustrated by and described with reference to apparatus diagrams, system diagrams, and flowcharts that relate to self-adapting autonomous transmission configuration.

FIG. 1 illustrates an example of a wireless communications system 100 that supports a self-adapting autonomous transmission configuration in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A MAC layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling.

A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform-spread-OFDM (DFT-s-OFDM)).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Some wireless communications systems may support URLLC services. As the name suggests, URLLC may be characterized by low latency and high reliability requirements (e.g., <1 ms latency and >99.9999% reliability). In some cases, the URLLC services may further include periodic traffic transmitted between a base station 105 and a UE 115. For example, in factory automation URLLC use cases, uplink and downlink periodic transmissions may be sent between a PLC (e.g., a base station 105) and an A/S (e.g., a UE 115). This periodic traffic may occur at set time periods based on a configured periodicity. Additionally or alternatively, periodic traffic may not be limited to URLLC services and may be utilized for services where data is regularly transmitted between a base station 105 and a UE 115 at set time intervals (e.g., periodically). In some cases, a base station 105 may include a large number of UEs 115 that are connected to the base station 105. For example, the factory automation URLLC use cases may involve a high user density (e.g., one UE 115 per square meter), resulting in a large number of UEs 115 per base station 105. As such, if a physical downlink control channel (PDCCH) is utilized for signaling upcoming resources for the periodic traffic for each data transmission (e.g., downlink and uplink transmissions), a bottleneck may occur where there are too many PDCCHs to transmit at a given time for the base station 105, and the base station 105 may not be able to handle all of the periodic traffic. For example, sending downlink grants (e.g., sending one DCI per slot) to each UE 115 may result in a large PDCCH overhead (e.g., signaling overhead) for the base station 105.

To reduce the PDCCH overhead and needs, autonomous transmission configurations may be utilized, where grants are configured semi-statically (e.g., via RRC signaling and/or a DCI) by the base station 105 for each of the UEs 115. The autonomous transmission configurations may allocate one or more RBs based on a periodicity that may be utilized for the periodic traffic and/or include an MCS (e.g., data rate) for the periodic traffic. In some cases, the autonomous transmission configurations may include an SPS configuration and/or a CS configuration (e.g., Type 1 Configured Grants, Type 2 Configured Grants, etc.). For example, the SPS configuration may be utilized for downlink transmissions, and the CS configuration may be utilized for uplink transmissions. Additionally or alternatively, the SPS configurations may be utilized for both uplink and downlink transmissions, or the CS configuration may be utilized for both uplink and downlink transmissions (e.g., based on the network for wireless communications system 100). Accordingly, the autonomous transmission configurations may reduce the PDCCH overhead and needs by semi-statically configuring the parameters (e.g., resources, MCS, etc.) for the autonomous transmissions such that multiple PDCCHs are not transmitted for each UE 115 connected to the base station 105.

In some cases, the autonomous transmission configurations may be based on imperfect channel knowledge. For example, the autonomous transmission configurations (and activation or reactivation) may be based on imperfect knowledge about the channel conditions associated with the RBs allocated for the autonomous transmission configurations. In the example of URLLC use cases, the low latency requirements may not provide the base station 105 with enough time to configure, measure, and report measurements for the channel conditions prior to transmitting the autonomous transmission configuration to the UE(s) 115. Based on the imperfect channel knowledge, the autonomous transmission configuration may be either conservative or aggressive. For example, a conservative configuration may include an over allocation of RBs and/or an underestimate of an MCS/rank for the autonomous transmissions in order to compensate for the imperfect channel knowledge. Additionally or alternatively, an aggressive configuration may include an under allocation of RBs and/or an overestimate of an MCS/rank for the autonomous transmissions (e.g., because not enough RBs are available to use a conservative approach for all UEs 115).

Conventionally, the base station 105 may transmit an updated autonomous transmission configuration to one or more UEs 115 based on the imperfect channel knowledge that led to the conservative or aggressive configurations. Accordingly, the updated autonomous transmission configurations may adjust one or more characteristics of the original autonomous transmission configurations to mitigate the conservative or aggressive configurations. However, these updated autonomous transmission configurations may include additional signaling and require more PDCCH resources, increasing the PDCCH overhead that was reduced via the autonomous transmission configuration.

Wireless communications system 100 may support efficient techniques for configuring autonomous transmissions that include a configuration for self-adapting the autonomous transmission configurations. For example, the configuration for the self-adapting may indicate adaptation conditions under which the autonomous transmission configurations can be adapted without additional UE-network signaling (e.g., via RRC signaling, DCI messages, MAC CE messages, etc.). In some cases, the adaptation conditions may include one or more first triggers that increase an allocation of RBs and/or decrease the MCS for the autonomous transmission configurations. These one or more first triggers may include a specific retransmission occurring, multiple retransmissions occurring, or a channel measurement falling below a threshold. Additionally or alternatively, the adaptation conditions may include one or more second triggers that decrease an allocation of RBs and/or increase the MCS for the autonomous transmission configurations. These one or more second triggers may include a specific retransmission not occurring, no retransmissions occurring during a specified time window, or a channel measurement being above a threshold. In some cases, the autonomous transmission configuration may include a non-self-adapting configuration (e.g., a baseline configuration) and a self-adapting configuration (e.g., temporary or boost configuration), where the two configurations may be configured separately. The self-adapting configuration may require fewer downlink control transmissions even with imperfect channel knowledge, and, thus, a lesser downlink control channel capacity may be supported.

Additionally, the autonomous transmission configuration may be indicated through a MAC CE, where the autonomous transmission configuration may be self-adapting or non-self-adapting. The autonomous transmission configuration may include an indication of a set of resources, a time offset, a periodicity, a data rate, or a combination thereof for the autonomous transmissions. In some cases, the autonomous transmission configuration may also be activated using a MAC CE (e.g., the same MAC CE that indicates the configuration or an additional MAC CE). Alternatively, the MAC CE that configures the autonomous transmissions may be coupled with a DCI message (e.g., the MAC CE and DCI message are transmitted together or separately), where the DCI message activates the autonomous transmission configuration. As described above, the autonomous transmission configuration activated by the DCI message may include a self-adapting configuration that adjusts the autonomous transmission configuration based on an identified trigger. The MAC CE may allow for a flexible and fast autonomous transmission configuration without having to modify existing DCI design.

Figure 2:
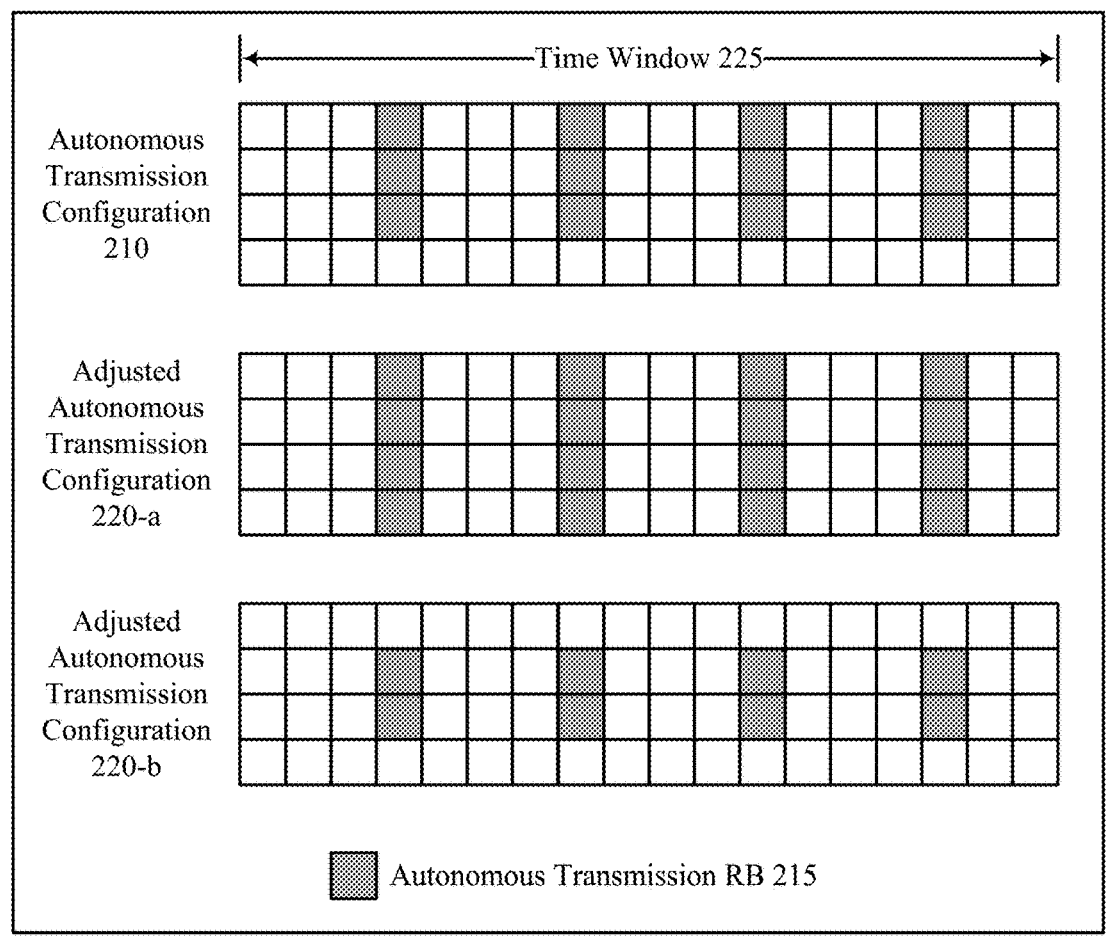
FIG. 2 illustrates an example of a wireless communications system that supports a self-adapting autonomous transmission configuration in accordance with aspects of the present disclosure.
Figure 2:
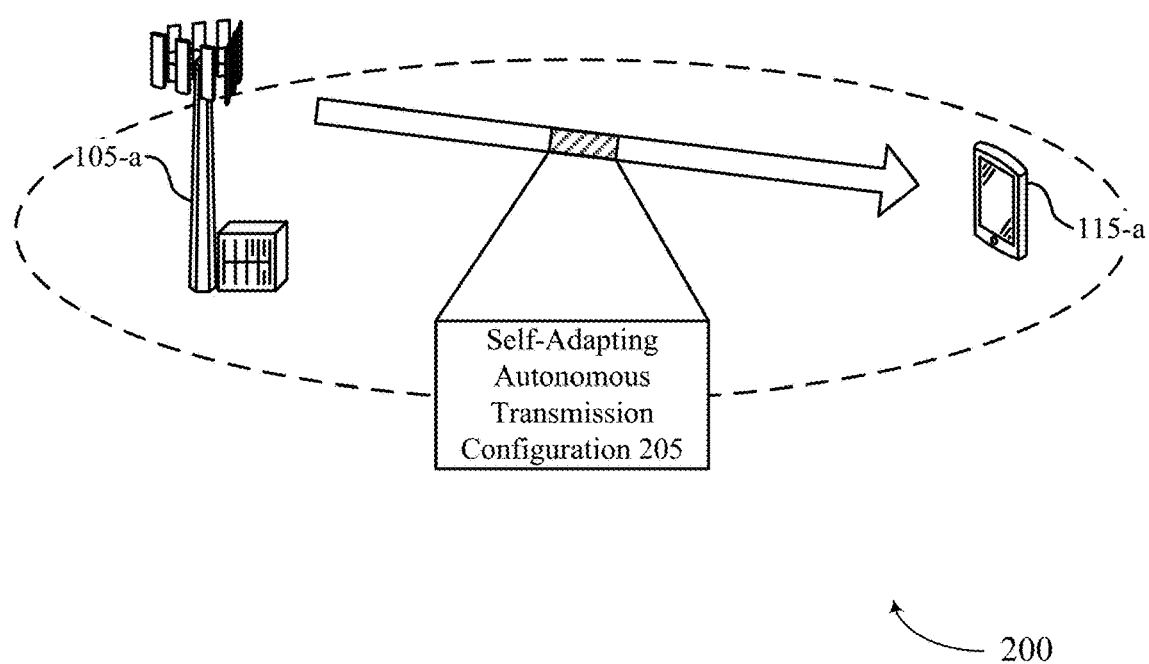

FIG. 2 illustrates an example of a wireless communications system 200 that supports a self-adapting autonomous transmission configuration in accordance with aspects of the present disclosure. In some examples, wireless communications system 200 may implement aspects of wireless communications system 100. Wireless communications system 200 may include a base station 105-*a* and a UE 115-*a*, which may be examples of a base station 105 and a UE 115, respectively, as described above with reference to FIG. 1.

Base station 105-*a* may transmit a self-adapting autonomous transmission configuration 205 to UE 115-*a* for periodic traffic (e.g., autonomous transmissions) to be transmitted between base station 105-*a* and UE 115-*a*. For example, the self-adapting autonomous transmission configuration 205 may include an SPS and/or CS configuration of resources, MCS, and additional parameters to accommodate the periodic traffic. In some cases, base station 105-*a* may signal the self-adapting autonomous transmission configuration 205 to UE 115-*a* via RRC signaling or a combination of RRC signaling and DCI messaging (e.g., RRC signals the configuration and DCI activates the configuration). As shown, the self-adapting autonomous transmission configuration 205 may include an autonomous transmission configuration 210 (e.g., original or initially configured autonomous transmission configuration) that includes one or more autonomous transmission RBs 215 allocated for UE 115-*a* for the periodic traffic. The autonomous transmission RBs 215 may be equally spaced within a time window 225 according to a set periodicity based on the periodic traffic. In some cases, as described above the initially allocated autonomous transmission RBs 215 may be insufficient (e.g., a conservative configuration) or excessive (e.g., an aggressive configuration) for one or more periodic transmissions of the periodic traffic.

As described herein, the self-adapting autonomous transmission configuration 205 may also indicate adaptation triggers that cause autonomous transmission configuration 210 to be adjusted (or adapted) without additional UE-network signaling. Additionally, the self-adapting autonomous transmission configuration 205 may include information for the adjustments to be made based on the adaptation triggers. As such, base station 105-*a* and UE 115-*a* may both adjust self-adapting autonomous transmission configuration 205 to determine an adjusted autonomous transmission configuration 220 based on identifying one of the adaptation triggers and the adjustment information indicated in the self-adapting autonomous transmission configuration 205.

For example, autonomous transmission configuration 210 may be adjusted by increasing or decreasing a number of allocated resources for the periodic traffic by a number of autonomous transmission RBs 215 included in the self-adapting autonomous transmission configuration 205. In some cases, the specific autonomous transmission RBs 215 that are excluded may also be included in the self-adapting autonomous transmission configuration 205. Additionally or alternatively, autonomous transmission configuration 210 may be adjusted by increasing or decreasing an initially configured MCS either by a number included in the self-adapting autonomous transmission configuration 205 or to a number included in the self-adapting autonomous transmission configuration 205. For the adjustments, the increases and decreases for the autonomous transmission parameters (e.g., RBs allocated, MCS, etc.) may be subject to lower and/or upper bounds. For example, the allocation of autonomous transmission RBs 215 may not be decreased to less than two (2) RBs.

As shown, adjusted autonomous transmission configuration 220-*a* may be determined based on an adaptation trigger that causes an increase in the allocation of autonomous transmission RBs 215 and/or a decrease in the MCS of autonomous transmission configuration 210. For example, adjusted autonomous transmission configuration 220-*a* may include four (4) autonomous transmission RBs 215 allocated for the periodic traffic rather than the three (3) autonomous transmission RBs 215 allocated in autonomous transmission configuration 210 (e.g., initial/previous autonomous transmission configuration).

The adaptation trigger for determining adjusted autonomous transmission configuration 220-*a* may include detecting a retransmission for a periodic transmission occurring during a specified time window (e.g., duration of time from the DCI activating the self-adapting autonomous transmission configuration 205). Additionally or alternatively, the adaptation trigger may include detecting a multiple of retransmissions, where a K-th retransmission maps to a K-th set of predefined RBs. Accordingly, when the K-th retransmission is detected, autonomous transmission configuration 210 may be adjusted accordingly, where K is a positive integer. Base station 105-*a* and UE 115-*a* may monitor for the K-th retransmission during a specified time window similar to the retransmission described above. The specified time window may be indicated using the self-adapting autonomous transmission configuration 205 or may be preconfigured. Additionally, the specified time window may begin at a duration of time after the DCI is transmitted/received activating the self-adapting autonomous transmission configuration 205, where the duration of time may be expressed as a number of time units, a number of slots, a number of symbols, etc. Additionally or alternatively, the adaptation trigger for adjusted autonomous transmission configuration 220-*a* may include a channel measurement falling below a threshold value, where UE 115-*a* transmits the channel measurement to base station 105-*a*. For example, the channel measurement may include a channel state information (CSI) measurement, an RRC measurement, or a different channel measurement.

As shown, adjusted autonomous transmission configuration 220-*b* may be determined based on an adaptation trigger that causes a decrease in the allocation of autonomous transmission RBs 215 and/or an increase in the MCS of autonomous transmission configuration 210. For example, adjusted autonomous transmission configuration 220-*b* may include two (2) autonomous transmission RBs 215 allocated for the periodic traffic rather than the three (3) autonomous transmission RBs 215 allocated in autonomous transmission configuration 210 (e.g., initial/previous autonomous transmission configuration).

The adaptation trigger for adjusted autonomous transmission configuration 220-*b* may include not detecting a retransmission for a periodic transmission during a specified time window (e.g., duration of time from the DCI activating the self-adapting autonomous transmission configuration 205). Additionally or alternatively, the adaptation trigger may include not detecting retransmissions during a K-th specified time window, where each time window has an associated predefined set of RBs. As described above, the specified time window may be indicated using the self-adapting autonomous transmission configuration 205 or may be preconfigured. Additionally, the specified time window may begin at a duration of time after the DCI is transmitted/received activating the self-adapting autonomous transmission configuration 205, where the duration of time may be expressed as a number of time units, a number of slots, a number of symbols, etc. Additionally or alternatively, the adaptation trigger for adjusted autonomous transmission configuration 220-*b* may include a channel measurement (e.g., CSI measurement, RRC measurement, etc.) going above a threshold value, where UE 115-*a* transmits the channel measurement to base station 105-*a*.

In some cases, the self-adapting autonomous transmission configuration 205 may include a non-self-adapting configuration (e.g., a baseline configuration) and a self-adapting configuration (e.g., temporary or boost configuration), where the two configurations may be configured separately.

For example, autonomous transmission configuration 210 may be the baseline configuration, and adjusted autonomous transmission configuration 220-*a* may be a boost configuration. The two configurations may have separate activation/deactivation triggers. For example, interference may be expected for part of the periodic traffic, so adjusted autonomous transmission configuration 220-*a* may be triggered prior to the expected interference in order to mitigate the interference. Additionally, adjusted autonomous transmission configuration 220-*a* may be further adjusted up to a bound based on detecting additional triggers (e.g., retransmissions, reported channel measurements below a threshold, etc.). For example, adjusted autonomous transmission configuration 220-*a* may include more than four (4) autonomous transmission RBs 215 based on the periodic traffic not be transmitted successfully and may increase the RB allocation until the adjusted autonomous transmission configuration 220-*a* is deactivated (e.g., based on a successful periodic traffic transmission).

Figure 3A:
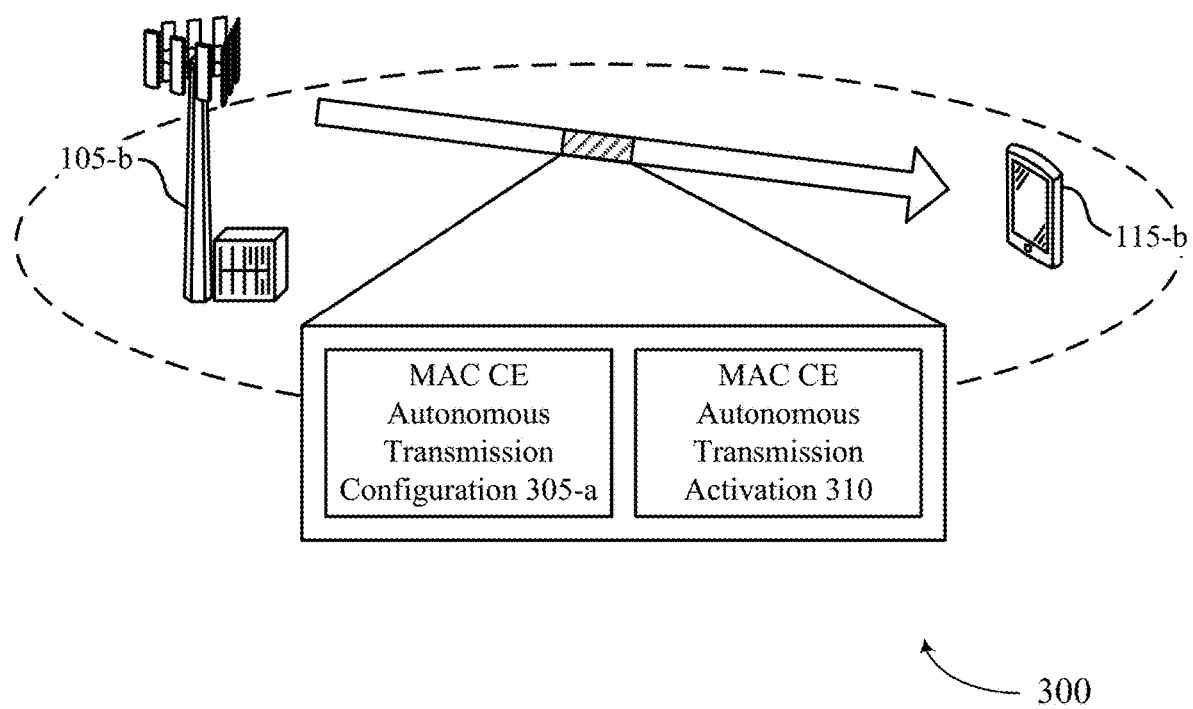
FIGS. 3A and 3B illustrate examples of autonomous transmission configuration activations in accordance with aspects of the present disclosure.

FIG. 3A illustrates an example of an autonomous transmission configuration activation 300 in accordance with aspects of the present disclosure. In some examples, autonomous transmission configuration activation 300 may implement aspects of wireless communications systems 100 and/or 200. Autonomous transmission configuration activation 300 may include a base station 105-*b* and a UE 115-*b*, which may be examples of a base station 105 and a UE 115, respectively, as described above with reference to FIGS. 1 and 2. As described above, base station 105-*b* and UE 115-*b* may transmit periodic traffic back and forth based on an autonomous transmission configuration that allocates resources (e.g., RBs) for the periodic traffic and configures an MCS (e.g., data rate) for the periodic traffic. In the example of wireless communications system 200 in FIG. 2, the autonomous transmission configuration may be transmitted via RRC signaling and activated via RRC signaling as well or via a DCI message. However, the autonomous transmission configuration may be transmitted and activated via different signaling.

In some cases, base station 105-*b* may transmit a MAC CE autonomous transmission configuration 305-*a* that includes one or more of an indication of a set of RBs, a time offset, a periodicity, an MCS, or a combination thereof for the autonomous transmissions. Additionally, MAC CE autonomous transmission configuration 305-*a* may be self-adapting as described above or non-self-adapting. If MAC CE autonomous transmission configuration 305-*a* is non-self-adapting, MAC CE autonomous transmission configuration 305-*a* may include two (2) periodic grants with different periodicities/grants. Additionally, the autonomous transmission configuration may also be activated using a MAC CE autonomous transmission activation 310. Although shown to be two different messages, it is to be understood that MAC CE autonomous transmission configuration 305-*a* may also include MAC CE autonomous transmission activation 310 for the autonomous transmission activation. After MAC CE autonomous transmission activation 310 is transmitted by base station 105-*b* and received by UE 115-*b*, the two wireless devices may communicate according to MAC CE autonomous transmission configuration 305-*a*. Transmitting MAC CE autonomous transmission configuration 305-*a* may reduce latency associated with transmitting information (e.g., including the configuration) via other types of signaling.

Figure 3B:
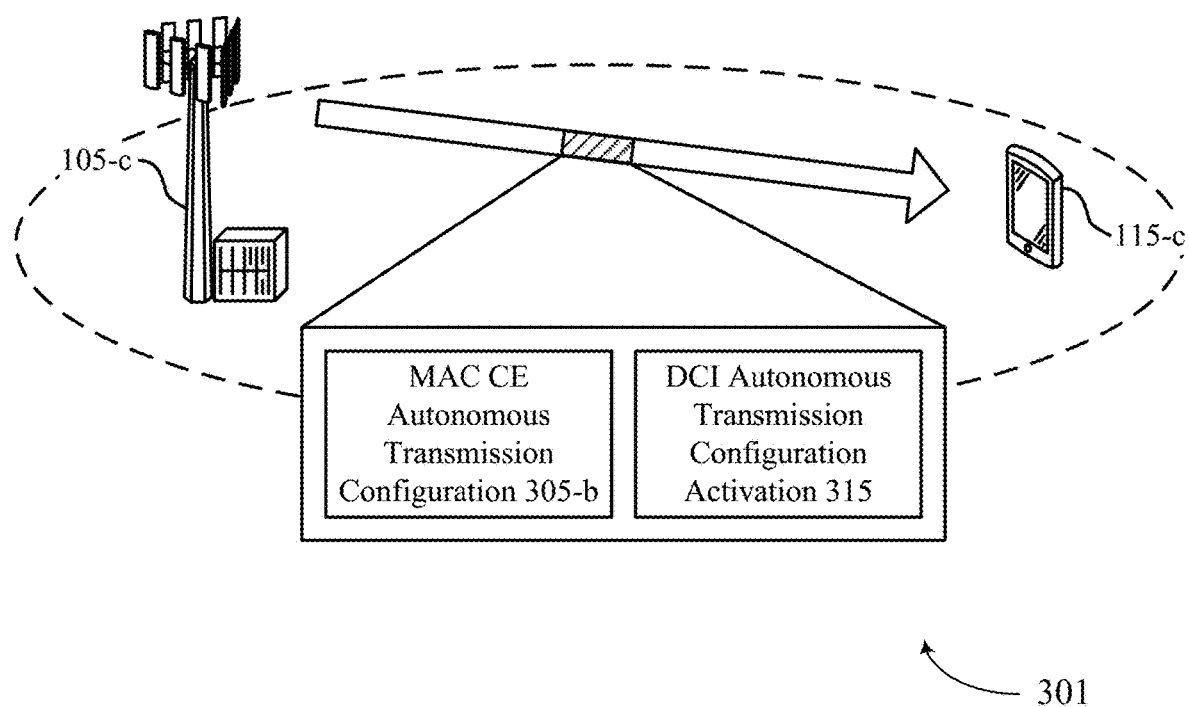

FIG. 3B illustrates an example of an autonomous transmission configuration activation 301 in accordance with aspects of the present disclosure. In some examples, autonomous transmission configuration activation 301 may implement aspects of wireless communications systems 100 and/or 200. Additionally, autonomous transmission configuration activation 301 may include a base station 105-*c* and a UE 115-*c*, which may be examples of a base station 105 and a UE 115, respectively, as described above with reference to FIGS. 1 through 3A.

As described above, base station 105-*c* may transmit and activate an autonomous transmission configuration via different signaling than RRC signaling. Similarly, base station 105-*c* may transmit a MAC CE autonomous transmission configuration 305-*b* that includes one or more of an indication of a set of RBs, a time offset, a periodicity, an MCS, or a combination thereof for the autonomous transmissions. Additionally, MAC CE autonomous transmission configuration 305-*b* may be self-adapting as described above or non-self-adapting. However, alternative to autonomous transmission configuration activation 300, a DCI autonomous transmission configuration activation 315 may be coupled with MAC CE autonomous transmission configuration 305-*b* for activating base station 105-*c* and UE 115-*c* to use MAC CE autonomous transmission configuration 305-*b*. In some cases, DCI autonomous transmission configuration activation 315 being coupled with MAC CE autonomous transmission configuration 305-*b* may include both the activation and configuration being transmitted together or separately. For a self-adapting autonomous transmission configuration, the adaptation triggers and adjustments may be included in MAC CE autonomous transmission configuration 305-*b*, and DCI autonomous transmission configuration activation 315 may carry out the activation of the autonomous transmission configuration.

Figure 4:
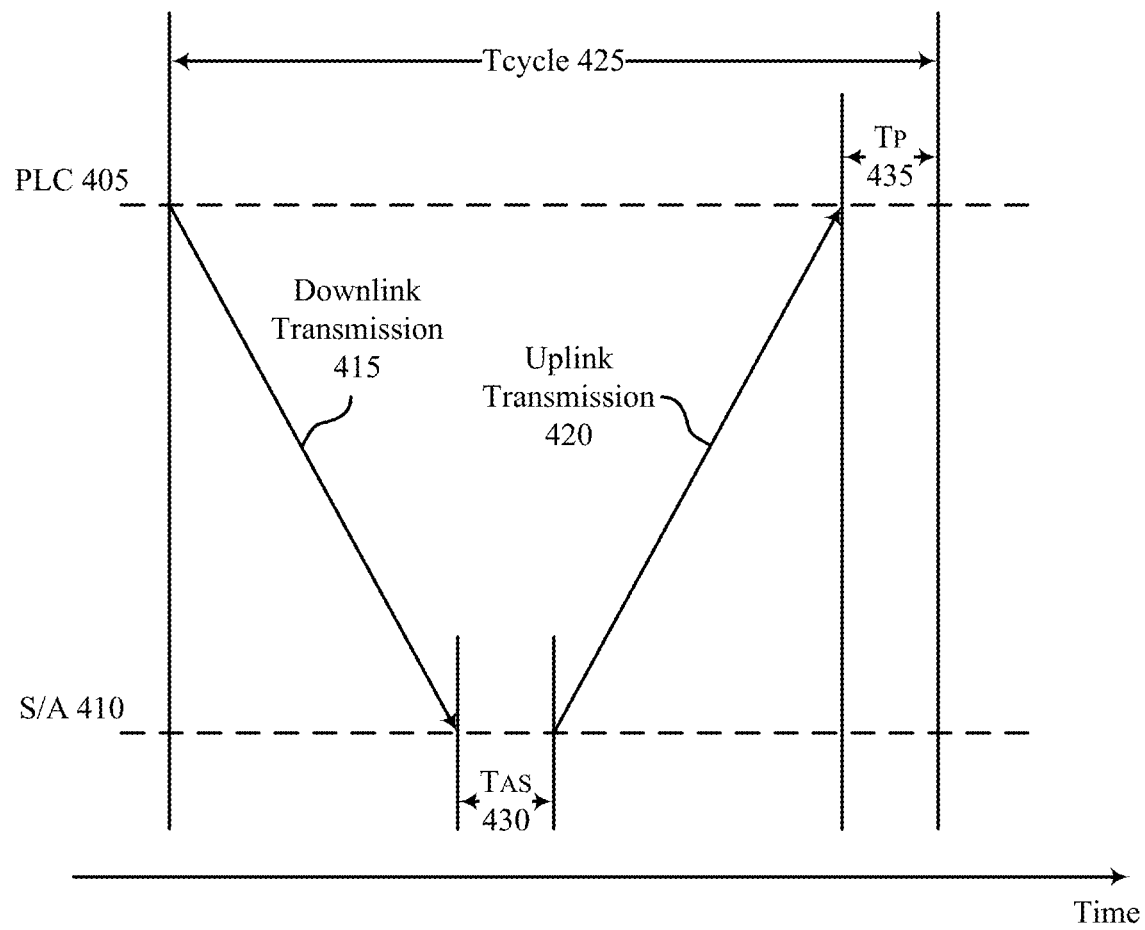
FIG. 4 illustrates an example of a periodic traffic transmission in accordance with aspects of the present disclosure.

FIG. 4 illustrates an example of a periodic traffic transmission 400 in accordance with aspects of the present disclosure. In some examples, periodic traffic transmission 400 may implement aspects of wireless communications systems 100 and/or 200. Periodic traffic transmission 400 may include data transmitted between a PLC 405 and an S/A 410 (e.g., sent between a base station 105 and a UE 115 as described above with reference to FIGS. 1 through 3B). Additionally, PLC 405 and S/A 410 may be part of a factory automation URLLC use case, where metrics are transmitted from S/A 410 to PLC 405 to ensure the factory automation is running within the low latency and high reliability requirements for URLLC services.

In some cases, PLC 405 may send a downlink transmission 415 periodically to S/A 410. The downlink transmission 415 may request information (e.g., performance metrics) from S/A 410. Accordingly, S/A 410 may send an uplink transmission 420 in response to the downlink transmission 415. Alternatively, although not shown, S/A 410 may send uplink transmission 420 without receiving the downlink transmission 415 based on a configured transmission schedule for the periodic traffic. The downlink transmission 415 and the uplink transmission 420 may be sent within a cycle duration ($T_{cycle}$) 425, where $T_{cycle}$ 425 represents one period for the periodic traffic. Additionally, an actuation and sensing duration ($T_{AS}$) 430 may occur between the downlink transmission 415 and the uplink transmission 420, where S/A 410 receives the downlink transmission 415 and gathers the requested data. After receiving the uplink transmission 420, PLC 405 may use a processing duration ($T_P$) 435 to process the uplink transmission 420 and receive the information from S/A 410.

As described herein, periodic traffic transmission 400 and $T_{cycle}$ 425 may represent one period of an autonomous transmission configuration. Accordingly, periodic traffic transmission 400 may span one or more RBs (e.g., resources) allocated for the autonomous transmission configuration and may be sent according to a configured MCS (e.g., data rate). Additionally, the autonomous transmission configuration may include a self-adaptation configuration for adjusting the autonomous transmission configuration without additional signaling to S/A 410. As such, if a different MCS or a different number of allocated RBs are needed, PLC 405 and S/A 410 may adjust the parameters for the autonomous transmission configuration by themselves.

Figure 5:
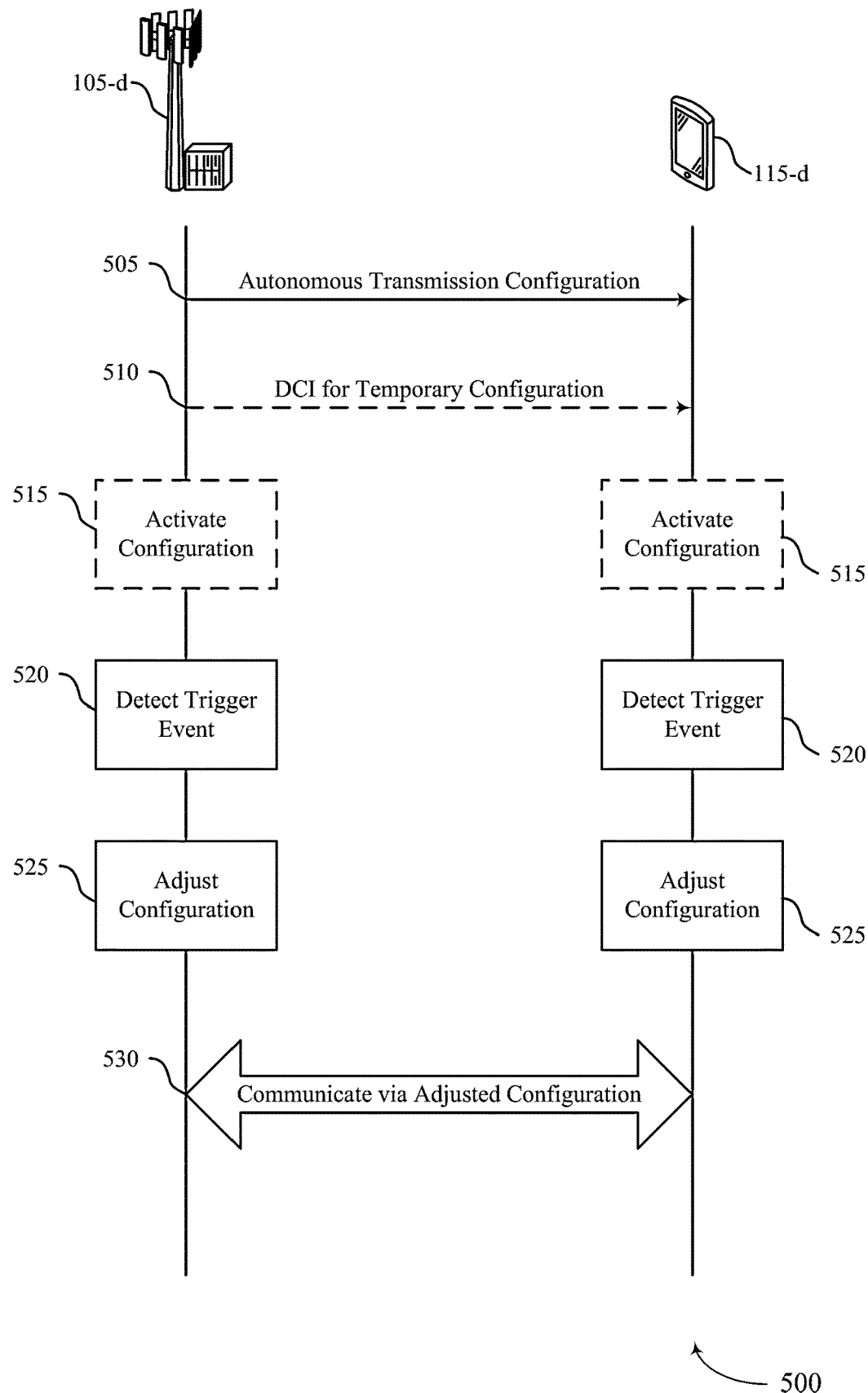
FIGS. 5 and 6 illustrate examples of process flows that support self-adapting autonomous transmissions in accordance with aspects of the present disclosure.

FIG. 5 illustrates an example of a process flow 500 that supports self-adapting autonomous transmissions in accordance with aspects of the present disclosure. In some examples, process flow 500 may implement aspects of wireless communications systems 100 and/or 200. Process flow 500 may include a base station 105-*d* and a UE 115-*d*, which may be examples of a corresponding base station 105 and UE 115, respectively, as described above with reference to FIGS. 1 through 4.

In the following description of the process flow 500, the operations between UE 115-*d* and base station 105-*d* may be performed in different orders or at different times. Certain operations may also be left out of the process flow 500, or other operations may be added to the process flow 500. It is to be understood that while UE 115-*d* and base station 105-*d* are shown performing a number of the operations of process flow 500, any wireless device may perform the operations shown.

At 505, UE 115-*d* may receive, from base station 105-*d*, a configuration that includes at least one of an MCS (e.g., data rate) or resources (e.g., RBs) for autonomous uplink transmissions from UE 115-*d* to base station 105-*d* or autonomous downlink transmissions from base station 105-*d* to UE 115-*d*. In some cases, UE 115-*d* may receive at least a portion of the configuration via a MAC CE. Additionally or alternatively, UE 115-*d* may receive, from base station 105-*d*, a DCI message activating a temporary configuration as a temporary replacement to a baseline configuration, where the temporary configuration and the baseline configuration are separately configured and activated.

At 510, UE 115-*d* may receive a DCI message subsequent to reception of the MAC CE.

At 515, UE 115-*d* and base station 105-*d* may activate the configuration upon reception of the MAC CE. Additionally or alternatively, UE 115-*d* and base station 105-*d* may activate the configuration upon reception of the DCI message based on the contents of the DCI message.

At 520, UE 115-*d* and base station 105-*d* may detect an occurrence of a trigger event for triggering a change (e.g., adaptation trigger) in the MCS or resources to be used for transmitting the autonomous uplink transmissions or for monitoring the autonomous downlink transmissions. In some cases, UE 115-*d* may receive, from base station 105-*d*, an indication of the trigger event in the configuration. Additionally or alternatively, the trigger event may be included in the MAC CE, and portions of the configuration may be included in both the MAC CE and the DCI message.

At 525, UE 115-*d* and base station 105-*d* may adjust the MCS or resources to be used for transmitting the autonomous uplink transmissions or for monitoring the autonomous downlink transmissions in accordance with the configuration and based on the occurrence of the trigger event. The adjustments may be based on information included in the configuration and may be subject to bounds.

In some cases, UE 115-*d* and base station 105-*d* may autonomously decrease the MCS and/or increase the resources to be used for transmitting the autonomous uplink transmissions or for monitoring the autonomous downlink transmissions. Accordingly, UE 115-d and base station 105-d may decrease the MCS and/or increase the resources based on identifying that a retransmission of an autonomous uplink transmission or an autonomous downlink transmission occurred, identifying that a specific retransmission (e.g., K-th retransmission, where K is positive) of an autonomous uplink transmission or an autonomous downlink transmission occurred, identifying that a retransmission of an autonomous uplink transmission or an autonomous downlink transmission occurred during a specific window of time, identifying that a CSI measurement or an RRC measurement (e.g., channel measurement) reported to base station 105-d is below a threshold, or a combination thereof (e.g., one or more first triggers). In some cases, the specific window of time is associated with a specific time duration (e.g., number of time units, slots, or symbols) beginning at a time of a slot on which a DCI message activating the autonomous uplink transmissions or autonomous downlink transmissions is received. Additionally, the threshold may include a predetermined threshold value or a threshold value indicated in the configuration.

Additionally or alternatively, UE 115-d and base station 105-d may autonomously increase the MCS and/or decrease the resources to be used for transmitting the autonomous uplink transmissions or for monitoring the autonomous downlink transmissions. Accordingly, UE 115-d and base station 105-d may increase the MCS and/or decrease the resources based on identifying that a specific retransmission of an autonomous uplink transmission or an autonomous downlink transmission did not occur, identifying that a retransmission of an autonomous uplink transmission or an autonomous downlink transmission did not occur during a specific window of time, identifying that a CSI measurement or an RRC measurement reported to the base station is above a threshold, or a combination thereof (e.g., one or more second triggers). In some cases, the specific window of time is associated with a specific time duration beginning at a time of a slot on which a DCI message activating the autonomous uplink transmissions or autonomous downlink transmissions is received. Additionally, the threshold may include a predetermined threshold value or a threshold value indicated in the configuration.

At 530, UE 115-d and base station 105-d may communicate using the adjusted MCS and/or resources.

Figure 6:
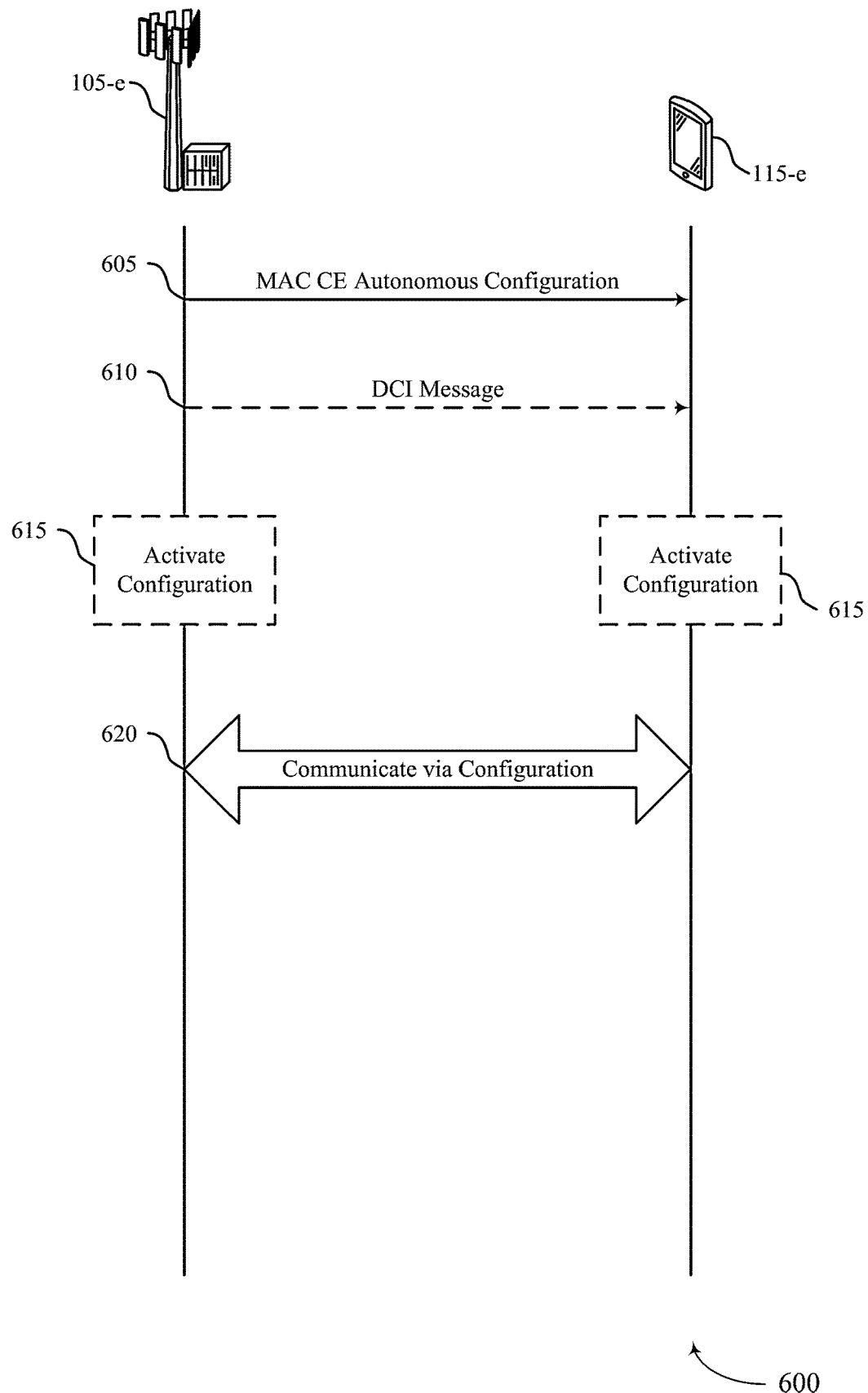

FIG. 6 illustrates an example of a process flow 600 that supports self-adapting autonomous transmissions in accordance with aspects of the present disclosure. In some examples, process flow 600 may implement aspects of wireless communications systems 100 and/or 200. Process flow 600 may include a base station 105-e and a UE 115-e, which may be examples of a corresponding base station 105 and UE 115, respectively, as described above with reference to FIGS. 1 through 5.

In the following description of the process flow 600, the operations between UE 115-e and base station 105-e may be performed in different orders or at different times. Certain operations may also be left out of the process flow 600, or other operations may be added to the process flow 600. It is to be understood that while UE 115-e and base station 105-e are shown performing a number of the operations of process flow 600, any wireless device may perform the operations shown.

At 605, UE 115-e may receive, from base station 105-e, a configuration for autonomous uplink transmissions from UE 115-e to base station 105-e or autonomous downlink transmissions from base station 105-e to UE 115-e, where the configuration is received via a MAC CE and includes one or more of an indication of a set of RBs, a time offset, a periodicity, or an MCS.

At 610, UE 115-e may receive, from base station 105-e, a DCI message subsequent to reception of the MAC CE.

At 615, base station 105-e and UE 115-e may activate the configuration upon transmission and reception, respectively, of the MAC CE. Additionally or alternatively, base station 105-e and UE 115-e may activate the configuration upon transmission and reception, respectively, of the DCI message.

At 620, base station 105-e and UE 115-e may communicate in accordance with the configuration.

Figure 7:
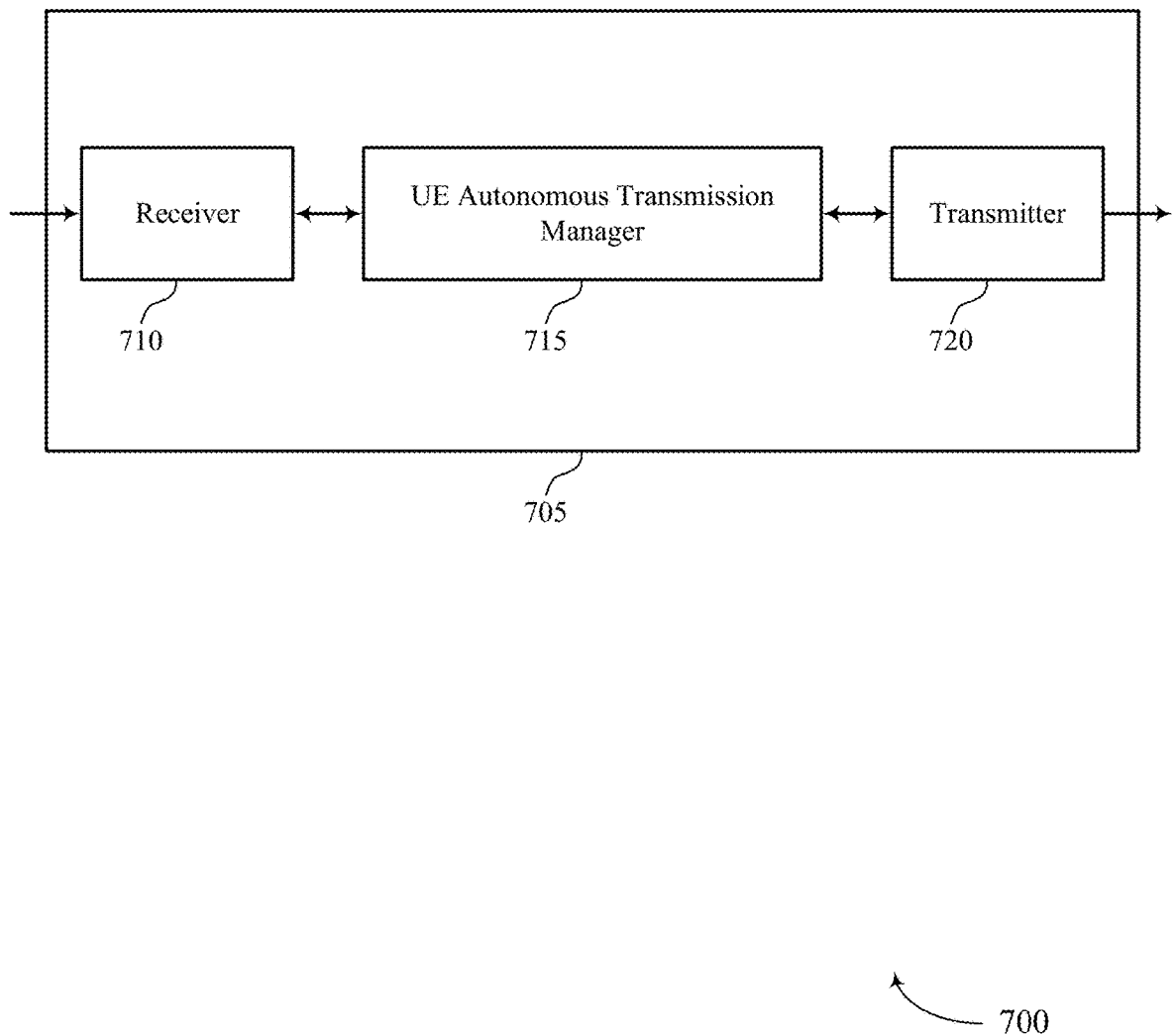
FIGS. 7 and 8 show block diagrams of devices that support a self-adapting autonomous transmission configuration in accordance with aspects of the present disclosure.

FIG. 7 shows a block diagram 700 of a device 705 that supports a self-adapting autonomous transmission configuration in accordance with aspects of the present disclosure. The device 705 may be an example of aspects of a UE 115 as described herein. The device 705 may include a receiver 710, a UE autonomous transmission manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to self-adapting autonomous transmission configuration, etc.). Information may be passed on to other components of the device 705. The receiver 710 may be an example of aspects of the transceiver 1020 described with reference to FIG. 10. The receiver 710 may utilize a single antenna or a set of antennas.

The UE autonomous transmission manager 715 may receive, from a base station, a configuration that includes at least one of an MCS or resources for autonomous uplink transmissions from the UE to the base station or autonomous downlink transmissions from the base station to the UE. In some cases, the UE autonomous transmission manager 715 may detect an occurrence of a trigger event for triggering a change in the MCS or resources to be used for transmitting the autonomous uplink transmissions or for monitoring the autonomous downlink transmissions. Accordingly, the UE autonomous transmission manager 715 may adjust the MCS or resources to be used for transmitting the autonomous uplink transmissions or for monitoring the autonomous downlink transmissions in accordance with the configuration and based on the occurrence of the trigger event. The UE autonomous transmission manager 715 may then communicate with the base station using the adjusted MCS or resources.

Additionally or alternatively, the UE autonomous transmission manager 715 may receive, from a base station, a configuration for autonomous uplink transmissions from the UE to the base station or autonomous downlink transmissions from the base station to the UE, where the configuration is received via a MAC CE and includes one or more of an indication of a set of RBs, a time offset, a periodicity, and an MCS. Accordingly, the UE autonomous transmission manager 715 may communicate with the base station in accordance with the configuration. The UE autonomous transmission manager 715 may be an example of aspects of the UE autonomous transmission manager 1010 described herein.

The UE autonomous transmission manager 715, or its sub-components, may be implemented in hardware, code (e.g., software or firmware) executed by a processor, or any combination thereof. If implemented in code executed by a processor, the functions of the UE autonomous transmission manager 715, or its sub-components may be executed by a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described in the present disclosure.

The UE autonomous transmission manager 715, or its sub-components, may be physically located at various positions, including being distributed such that portions of functions are implemented at different physical locations by one or more physical components. In some examples, the UE autonomous transmission manager 715, or its sub-components, may be a separate and distinct component in accordance with various aspects of the present disclosure. In some examples, the UE autonomous transmission manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
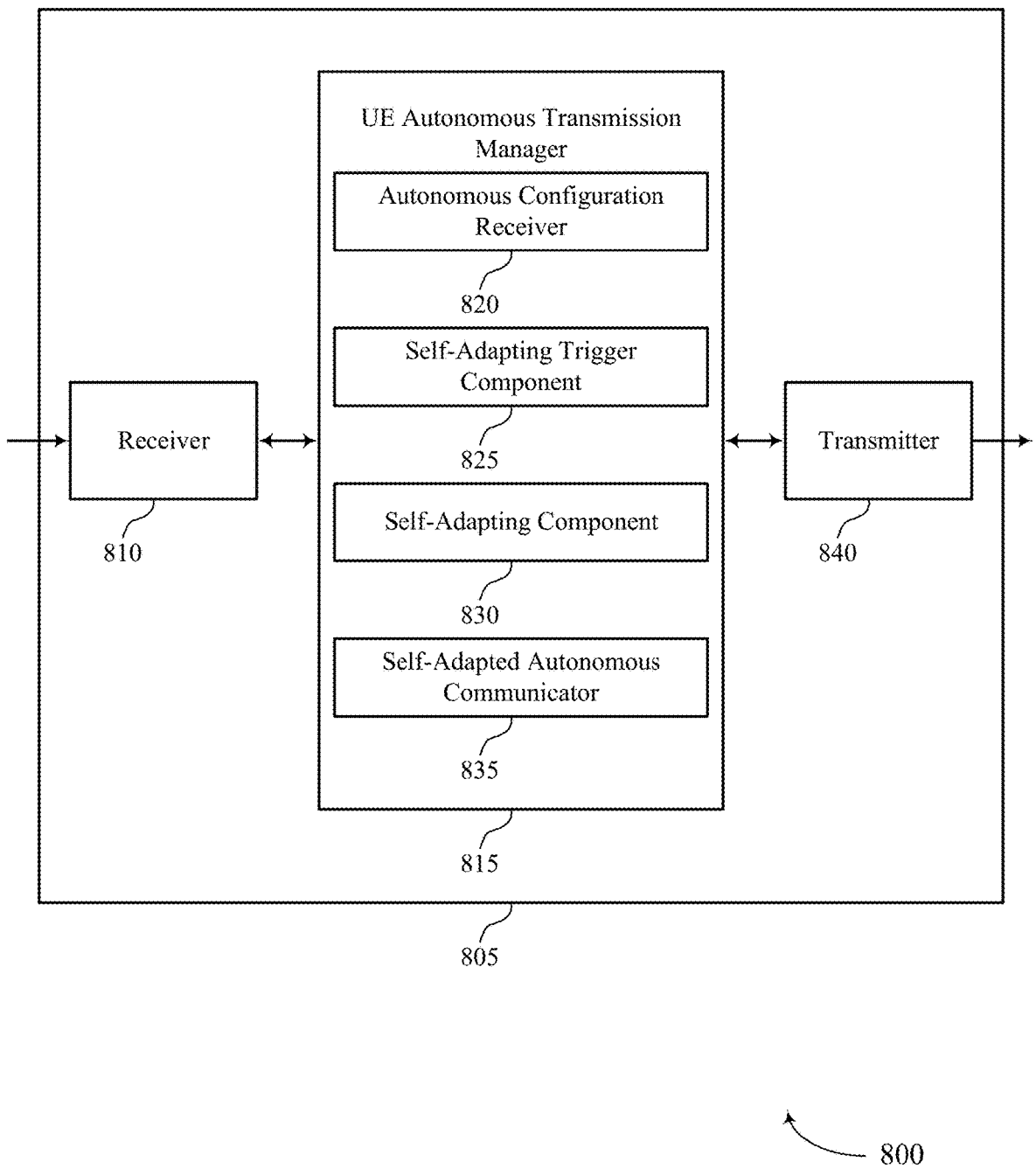

FIG. 8 shows a block diagram 800 of a device 805 that supports a self-adapting autonomous transmission configuration in accordance with aspects of the present disclosure. The device 805 may be an example of aspects of a device 705, or a UE 115 as described herein. The device 805 may include a receiver 810, a UE autonomous transmission manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to self-adapting autonomous transmission configuration, etc.). Information may be passed on to other components of the device 805. The receiver 810 may be an example of aspects of the transceiver 1020 described with reference to FIG. 10. The receiver 810 may utilize a single antenna or a set of antennas.

The UE autonomous transmission manager 815 may be an example of aspects of the UE autonomous transmission manager 715 as described herein. The UE autonomous transmission manager 815 may include an autonomous configuration receiver 820, a self-adapting trigger component 825, a self-adapting component 830, and a self-adapted autonomous communicator 835. The UE autonomous transmission manager 815 may be an example of aspects of the UE autonomous transmission manager 1010 described herein.

The autonomous configuration receiver 820 may receive, from a base station, a configuration that includes at least one of an MCS or resources for autonomous uplink transmissions from the UE to the base station or autonomous downlink transmissions from the base station to the UE.

The self-adapting trigger component 825 may detect an occurrence of a trigger event for triggering a change in the MCS or resources to be used for transmitting the autonomous uplink transmissions or for monitoring the autonomous downlink transmissions.

The self-adapting component 830 may adjust the MCS or resources to be used for transmitting the autonomous uplink transmissions or for monitoring the autonomous downlink transmissions in accordance with the configuration and based on the occurrence of the trigger event.

The self-adapted autonomous communicator 835 may communicate with the base station using the adjusted MCS or resources.

In some cases, the autonomous configuration receiver 820 may receive, from a base station, a configuration for autonomous uplink transmissions from the UE to the base station or autonomous downlink transmissions from the base station to the UE, where the configuration is received via a MAC CE and includes one or more of an indication of a set of RBs, a time offset, a periodicity, and an MCS. Accordingly, the self-adapted autonomous communicator 835 may communicate with the base station in accordance with the configuration.

The transmitter 840 may transmit signals generated by other components of the device 805. In some examples, the transmitter 840 may be collocated with a receiver 810 in a transceiver module. For example, the transmitter 840 may be an example of aspects of the transceiver 1020 described with reference to FIG. 10. The transmitter 840 may utilize a single antenna or a set of antennas.

Figure 9:
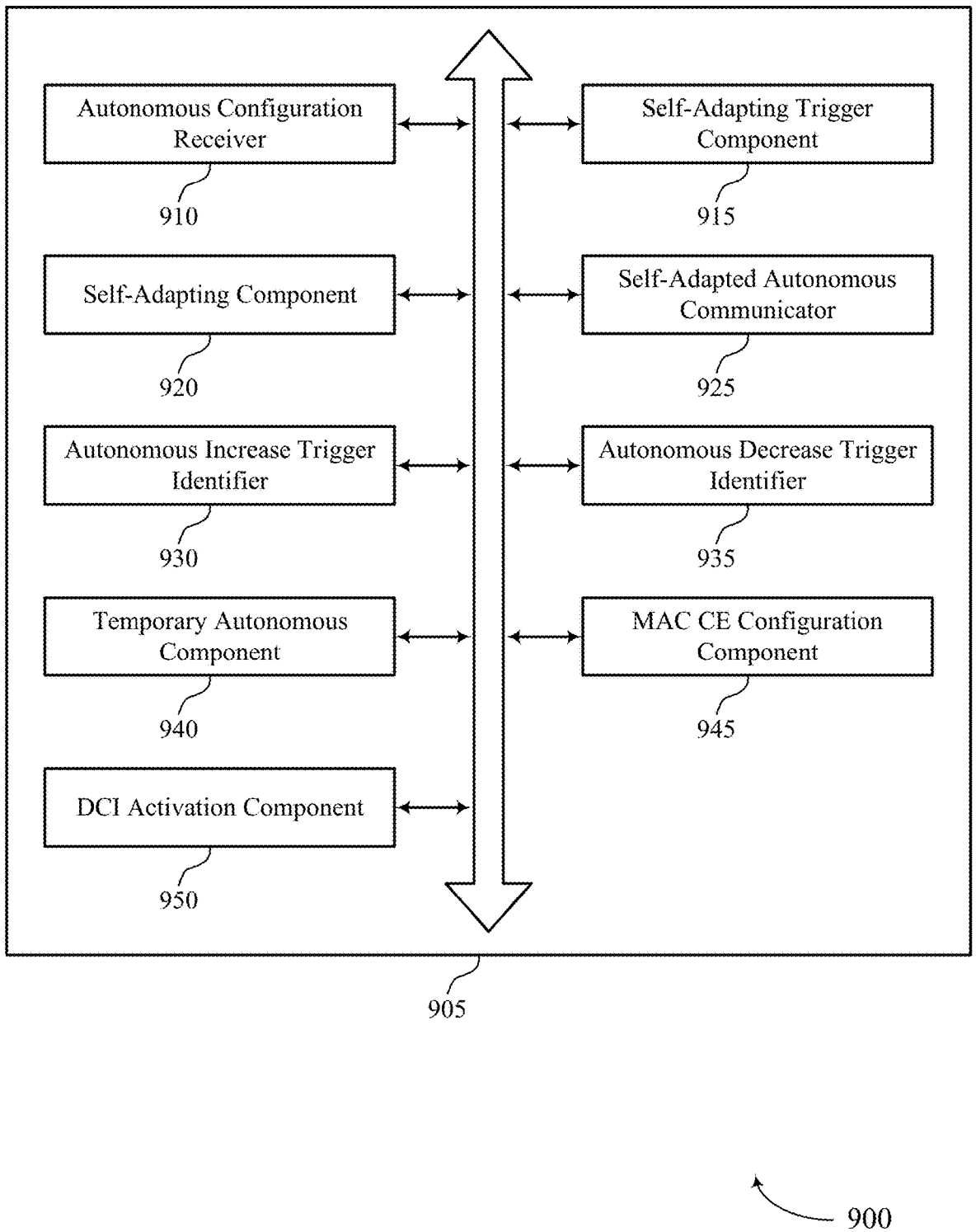
FIG. 9 shows a block diagram of a user equipment (UE) autonomous transmission manager in accordance with aspects of the present disclosure.

FIG. 9 shows a block diagram 900 of a UE autonomous transmission manager 905 that supports a self-adapting autonomous transmission configuration in accordance with aspects of the present disclosure. The UE autonomous transmission manager 905 may be an example of aspects of a UE autonomous transmission manager 715, a UE autonomous transmission manager 815, or a UE autonomous transmission manager 1010 described herein. The UE autonomous transmission manager 905 may include an autonomous configuration receiver 910, a self-adapting trigger component 915, a self-adapting component 920, a self-adapted autonomous communicator 925, an autonomous increase trigger identifier 930, an autonomous decrease trigger identifier 935, a temporary autonomous component 940, a MAC CE configuration component 945, and a DCI activation component 950. Each of these modules may communicate, directly or indirectly, with one another (e.g., via one or more buses).

The autonomous configuration receiver 910 may receive, from a base station, a configuration that includes at least one of an MCS or resources for autonomous uplink transmissions from the UE to the base station or autonomous downlink transmissions from the base station to the UE.

In some examples, the autonomous configuration receiver 910 may receive, from a base station, a configuration for autonomous uplink transmissions from the UE to the base station or autonomous downlink transmissions from the base station to the UE, where the configuration is received via a MAC CE and includes one or more of an indication of a set of RBs, a time offset, a periodicity, and an MCS.

The self-adapting trigger component 915 may detect an occurrence of a trigger event for triggering a change in the MCS or resources to be used for transmitting the autonomous uplink transmissions or for monitoring the autonomous downlink transmissions. In some examples, the autonomous configuration receiver 910 may receive an indication of the trigger event in the configuration.

The self-adapting component 920 may adjust the MCS or resources to be used for transmitting the autonomous uplink transmissions or for monitoring the autonomous downlink transmissions in accordance with the configuration and based on the occurrence of the trigger event.

In some cases, the self-adapting component 920 may autonomously decrease the MCS or increase the resources to be used for transmitting the autonomous uplink transmissions or for monitoring the autonomous downlink transmissions. Accordingly, the autonomous increase trigger identifier 930 may identify that a retransmission of an autonomous uplink transmission or an autonomous downlink transmission occurred. In some examples, the autonomous increase trigger identifier 930 may identify that a specific retransmission of an autonomous uplink transmission or an autonomous downlink transmission occurred. Additionally or alternatively, the autonomous increase trigger identifier 930 may identify that a retransmission of an autonomous uplink transmission or an autonomous downlink transmission occurred during a specific window of time. In some cases, the specific window of time may be associated with a specific time duration beginning at a time of a slot on which a DCI message activating the autonomous uplink transmissions or autonomous downlink transmissions is received. Additionally or alternatively, the autonomous increase trigger identifier 930 may identify that a CSI measurement or an RRC measurement reported to the base station is below a threshold, where the threshold includes a predetermined threshold value or a threshold value indicated in the configuration.

Additionally or alternatively, the self-adapting component 920 may autonomously increase the MCS or decrease the resources to be used for transmitting the autonomous uplink transmissions or for monitoring the autonomous downlink transmissions. Accordingly, the autonomous decrease trigger identifier 935 may identify that a specific retransmission of an autonomous uplink transmission or an autonomous downlink transmission did not occur. In some examples, the autonomous decrease trigger identifier 935 may identify that a retransmission of an autonomous uplink transmission or an autonomous downlink transmission did not occur during a specific window of time. In some cases, the specific window of time may be associated with a specific time duration beginning at a time of a slot on which a DCI message activating the autonomous uplink transmissions or autonomous downlink transmissions is received. Additionally or alternatively, the autonomous decrease trigger identifier 935 may identify that a CSI measurement or an RRC measurement reported to the base station is above a threshold, where the threshold includes a predetermined threshold value or a threshold value indicated in the configuration.

The self-adapted autonomous communicator 925 may communicate with the base station using the adjusted MCS or resources. In some examples, the self-adapted autonomous communicator 925 may communicate with the base station in accordance with the configuration.

The temporary autonomous component 940 may receive a DCI message activating the temporary configuration as a temporary replacement to a baseline configuration, where the temporary configuration and the baseline configuration are separately configured and activated.

The MAC CE configuration component 945 may receive at least a portion of the configuration via a MAC CE. In some examples, the MAC CE configuration component 945 may activate the configuration upon reception of the MAC CE. Additionally or alternatively, the MAC CE configuration component 945 may receive a DCI message subsequent to reception of the MAC CE and may activate the configuration upon reception of the DCI message. In some cases, the trigger event is included in the MAC CE, and portions of the configuration are included in both the MAC CE and the DCI message.

The DCI activation component 950 may receive a DCI message subsequent to reception of the MAC CE. In some examples, the DCI activation component 950 may activate the configuration upon reception of the DCI message.

Figure 10:
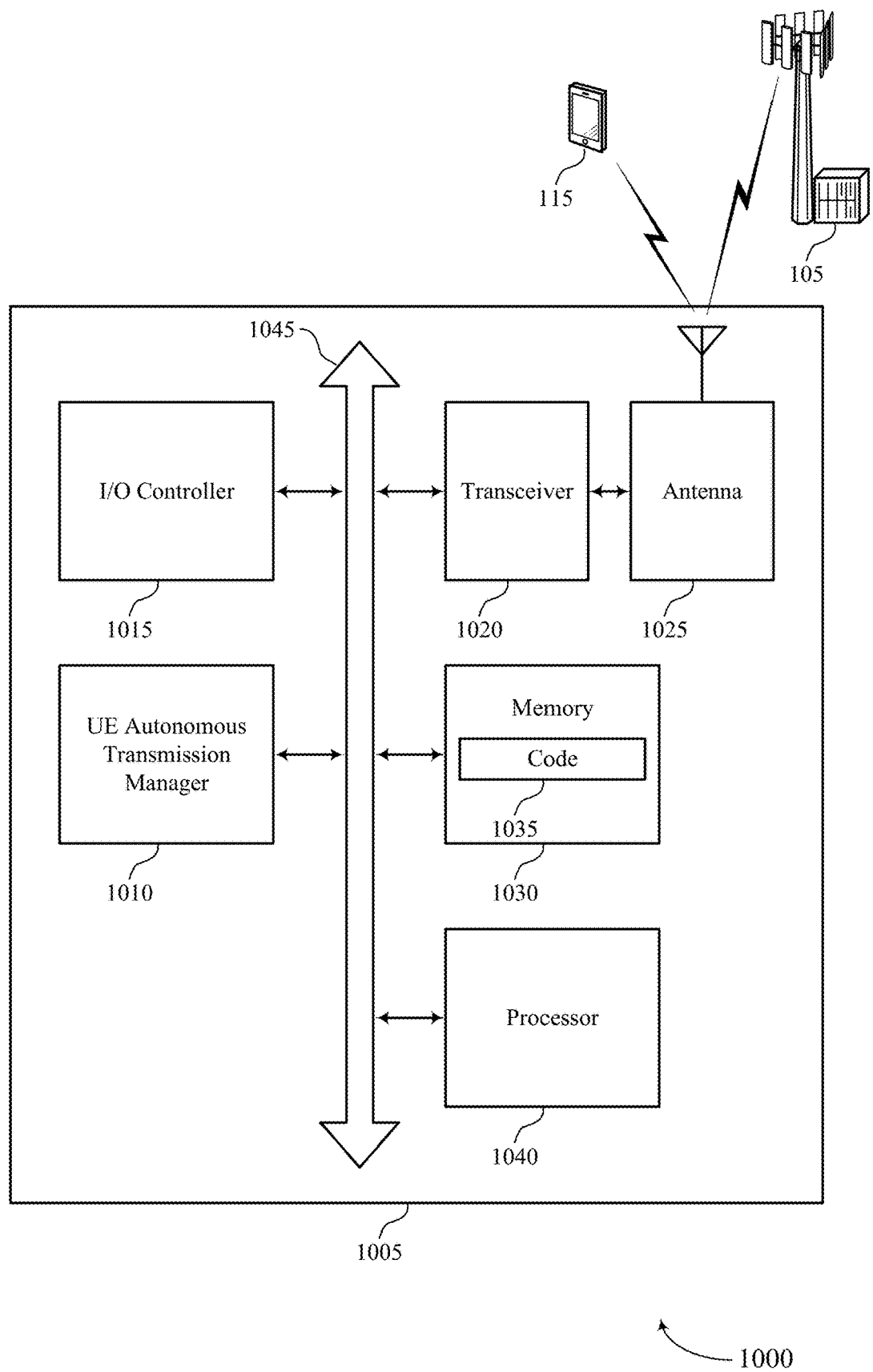
FIG. 10 shows a diagram of a system including a device that supports a self-adapting autonomous transmission configuration in accordance with aspects of the present disclosure.

FIG. 10 shows a diagram of a system 1000 including a device 1005 that supports a self-adapting autonomous transmission configuration in accordance with aspects of the present disclosure. The device 1005 may be an example of or include the components of device 705, device 805, or a UE 115 as described herein. The device 1005 may include components for bi-directional voice and data communications including components for transmitting and receiving communications, including a UE autonomous transmission manager 1010, an I/O controller 1015, a transceiver 1020, an antenna 1025, memory 1030, and a processor 1040. These components may be in electronic communication via one or more buses (e.g., bus 1045).

The UE autonomous transmission manager 1010 may receive, from a base station, a configuration that includes at least one of an MCS or resources for autonomous uplink transmissions from the UE to the base station or autonomous downlink transmissions from the base station to the UE. In some cases, the UE autonomous transmission manager 1010 may detect an occurrence of a trigger event for triggering a change in the MCS or resources to be used for transmitting the autonomous uplink transmissions or for monitoring the autonomous downlink transmissions. Accordingly, the UE autonomous transmission manager 1010 may adjust the MCS or resources to be used for transmitting the autonomous uplink transmissions or for monitoring the autonomous downlink transmissions in accordance with the configuration and based on the occurrence of the trigger event. The UE autonomous transmission manager 1010 may then communicate with the base station using the adjusted MCS or resources.

Additionally or alternatively, the UE autonomous transmission manager 1010 may receive, from a base station, a configuration for autonomous uplink transmissions from the UE to the base station or autonomous downlink transmissions from the base station to the UE, where the configuration is received via a MAC CE and includes one or more of an indication of a set of RBs, a time offset, a periodicity, and an MCS and communicate with the base station in accordance with the configuration.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device, (e.g., a general-purpose processor, a DSP, a central processing unit (CPU), a microcontroller, an ASIC, an FPGA, a PLD, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting self-adapting autonomous transmission configuration).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
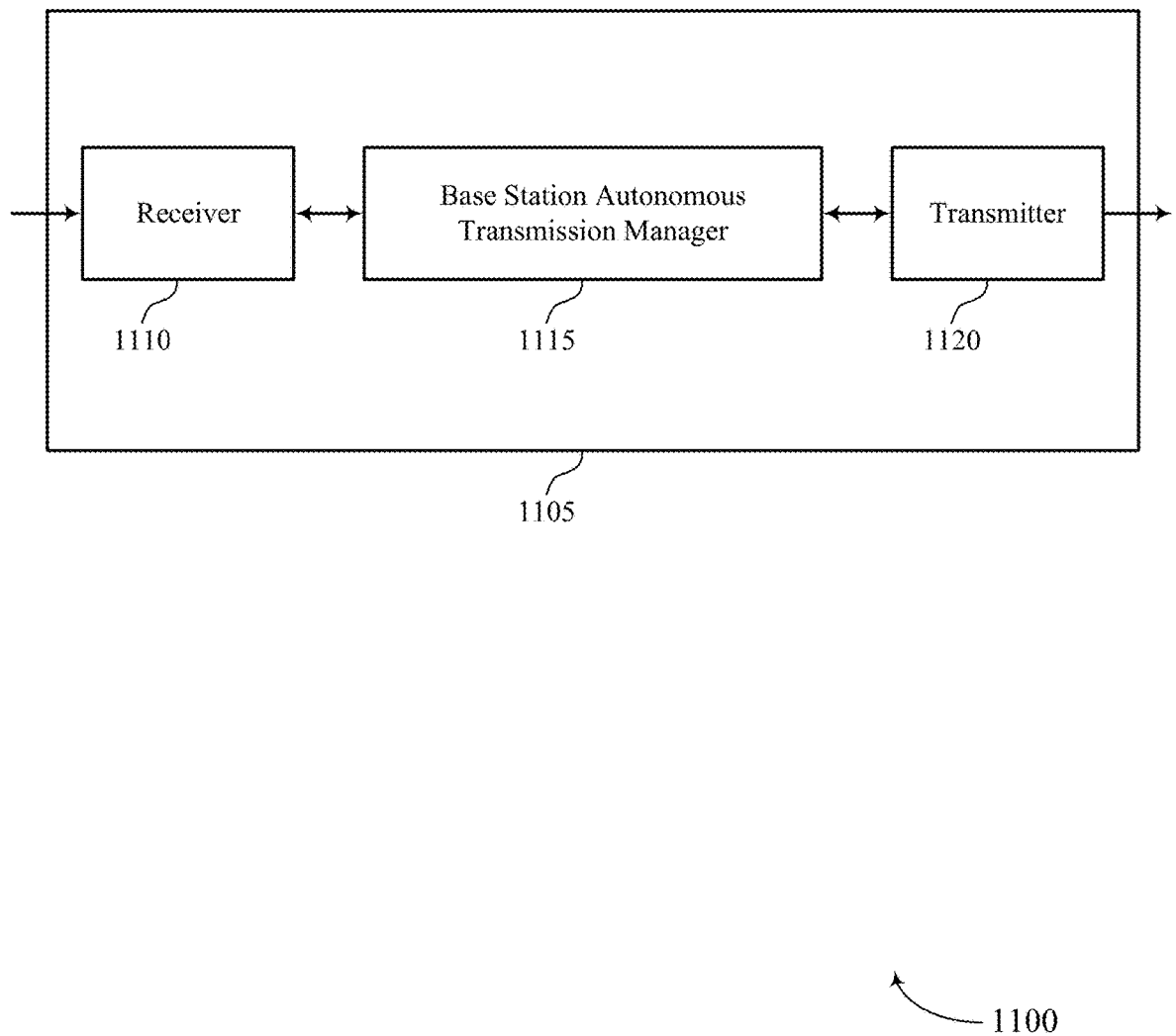
FIGS. 11 and 12 show block diagrams of devices that support a self-adapting autonomous transmission configuration in accordance with aspects of the present disclosure.

FIG. 11 shows a block diagram 1100 of a device 1105 that supports a self-adapting autonomous transmission configuration in accordance with aspects of the present disclosure. The device 1105 may be an example of aspects of a base station 105 as described herein. The device 1105 may include a receiver 1110, a base station autonomous transmission manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to self-adapting autonomous transmission configuration, etc.). Information may be passed on to other components of the device 1105. The receiver 1110 may be an example of aspects of the transceiver 1420 described with reference to FIG. 14. The receiver 1110 may utilize a single antenna or a set of antennas.

The base station autonomous transmission manager 1115 may transmit, to a UE, a configuration that includes at least one of an MCS or resources for autonomous uplink transmissions from the UE to the base station or autonomous downlink transmissions from the base station to the UE. In some cases, the base station autonomous transmission manager 1115 may detect an occurrence of a trigger event for triggering a change in the MCS or resources to be used for transmitting the autonomous downlink transmissions or for monitoring the autonomous uplink transmissions. Accordingly, the base station autonomous transmission manager 1115 may adjust the MCS or resources to be used for transmitting the autonomous downlink transmissions or for monitoring the autonomous uplink transmissions in accordance with the configuration and based on the occurrence of the trigger event without informing the UE. The base station autonomous transmission manager 1115 may then communicate with the UE using the adjusted MCS or resources.

Additionally or alternatively, the base station autonomous transmission manager 1115 may transmit, to a UE, a configuration for autonomous uplink transmissions from the UE to the base station or autonomous downlink transmissions from the base station to the UE, where the configuration is transmitted via a MAC CE and includes one or more of an indication of a set of RBs, a time offset, a periodicity, and an MCS. Accordingly, the base station autonomous transmission manager 1115 may communicate with the UE in accordance with the configuration. The base station autonomous transmission manager 1115 may be an example of aspects of the base station autonomous transmission manager 1410 described herein.

The base station autonomous transmission manager 1115, or its sub-components, may be implemented in hardware, code (e.g., software or firmware) executed by a processor, or any combination thereof. If implemented in code executed by a processor, the functions of the base station autonomous transmission manager 1115, or its sub-components may be executed by a general-purpose processor, a DSP, an ASIC, an FPGA or other PLD, discrete gate or transistor logic, discrete hardware components, or any combination thereof designed to perform the functions described in the present disclosure.

The base station autonomous transmission manager 1115, or its sub-components, may be physically located at various positions, including being distributed such that portions of functions are implemented at different physical locations by one or more physical components. In some examples, the base station autonomous transmission manager 1115, or its sub-components, may be a separate and distinct component in accordance with various aspects of the present disclosure. In some examples, the base station autonomous transmission manager 1115, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
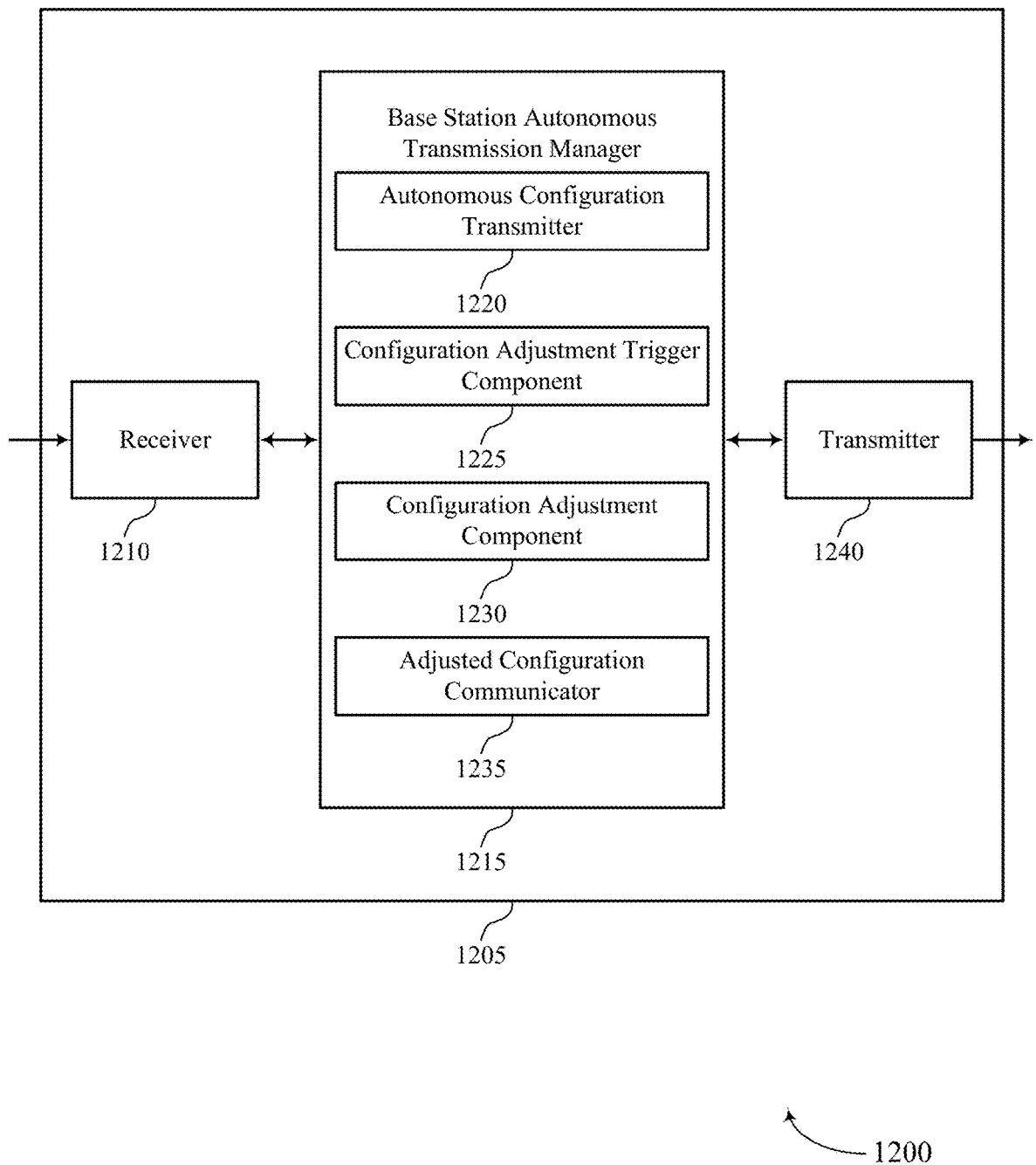

FIG. 12 shows a block diagram 1200 of a device 1205 that supports a self-adapting autonomous transmission configuration in accordance with aspects of the present disclosure. The device 1205 may be an example of aspects of a device 1105, or a base station 105 as described herein. The device 1205 may include a receiver 1210, a base station autonomous transmission manager 1215, and a transmitter 1240. The device 1205 may also include a processor. Each of these components may be in communication with one another (e.g., via one or more buses).

The receiver 1210 may receive information such as packets, user data, or control information associated with various information channels (e.g., control channels, data channels, and information related to self-adapting autonomous transmission configuration, etc.). Information may be passed on to other components of the device 1205. The receiver 1210 may be an example of aspects of the transceiver 1420 described with reference to FIG. 14. The receiver 1210 may utilize a single antenna or a set of antennas.

The base station autonomous transmission manager 1215 may be an example of aspects of the base station autonomous transmission manager 1115 as described herein. The base station autonomous transmission manager 1215 may include an autonomous configuration transmitter 1220, a configuration adjustment trigger component 1225, a configuration adjustment component 1230, and an adjusted configuration communicator 1235. The base station autonomous transmission manager 1215 may be an example of aspects of the base station autonomous transmission manager 1410 described herein.

The autonomous configuration transmitter 1220 may transmit, to a UE, a configuration that includes at least one of an MCS or resources for autonomous uplink transmissions from the UE to the base station or autonomous downlink transmissions from the base station to the UE.

The configuration adjustment trigger component 1225 may detect an occurrence of a trigger event for triggering a change in the MCS or resources to be used for transmitting the autonomous downlink transmissions or for monitoring the autonomous uplink transmissions.

The configuration adjustment component 1230 may adjust the MCS or resources to be used for transmitting the autonomous downlink transmissions or for monitoring the autonomous uplink transmissions in accordance with the configuration and based on the occurrence of the trigger event without informing the UE.

The adjusted configuration communicator 1235 may communicate with the UE using the adjusted MCS or resources.

In some cases, the autonomous configuration transmitter 1220 may transmit, to a UE, a configuration for autonomous uplink transmissions from the UE to the base station or autonomous downlink transmissions from the base station to the UE, where the configuration is transmitted via a MAC CE and includes one or more of an indication of a set of RBs, a time offset, a periodicity, and an MCS. Accordingly, the adjusted configuration communicator 1235 may communicate with the UE in accordance with the configuration.

The transmitter 1240 may transmit signals generated by other components of the device 1205. In some examples, the transmitter 1240 may be collocated with a receiver 1210 in a transceiver module. For example, the transmitter 1240 may be an example of aspects of the transceiver 1420 described with reference to FIG. 14. The transmitter 1240 may utilize a single antenna or a set of antennas.

Figure 13:
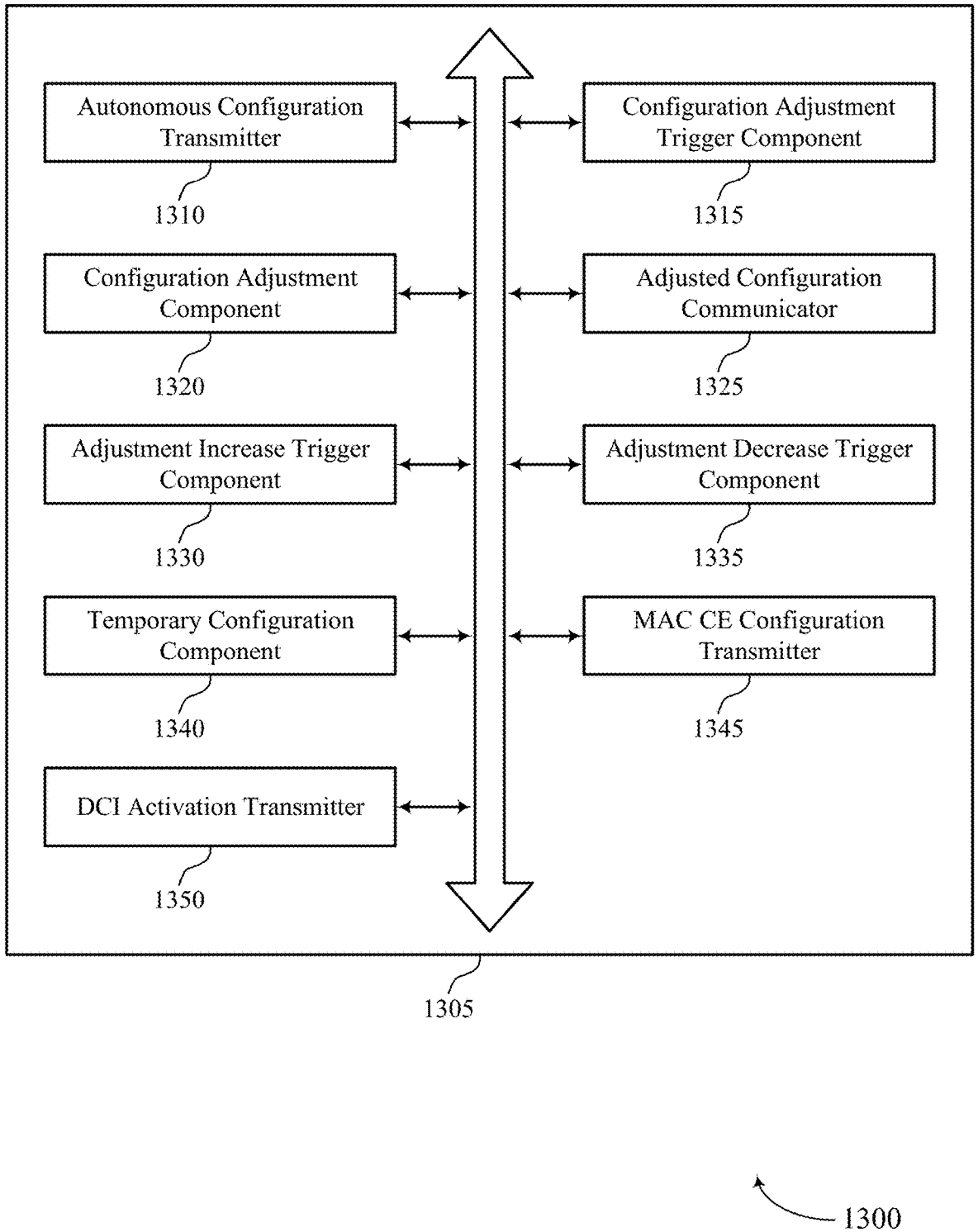
FIG. 13 shows a block diagram of a base station autonomous transmission manager in accordance with aspects of the present disclosure.

FIG. 13 shows a block diagram 1300 of a base station autonomous transmission manager 1305 that supports a self-adapting autonomous transmission configuration in accordance with aspects of the present disclosure. The base station autonomous transmission manager 1305 may be an example of aspects of a base station autonomous transmission manager 1115, a base station autonomous transmission manager 1215, or a base station autonomous transmission manager 1410 described herein. The base station autonomous transmission manager 1305 may include an autonomous configuration transmitter 1310, a configuration adjustment trigger component 1315, a configuration adjustment component 1320, an adjusted configuration communicator 1325, an adjustment increase trigger component 1330, an adjustment decrease trigger component 1335, a temporary configuration component 1340, a MAC CE configuration transmitter 1345, and a DCI activation transmitter 1350. Each of these modules may communicate, directly or indirectly, with one another (e.g., via one or more buses).

The autonomous configuration transmitter 1310 may transmit, to a UE, a configuration that includes at least one of an MCS or resources for autonomous uplink transmissions from the UE to the base station or autonomous downlink transmissions from the base station to the UE. In some examples, the autonomous configuration transmitter 1310 may transmit, to a UE, a configuration for autonomous uplink transmissions from the UE to the base station or autonomous downlink transmissions from the base station to the UE, where the configuration is transmitted via a MAC CE and includes one or more of an indication of a set of RBs, a time offset, a periodicity, and an MCS.

The configuration adjustment trigger component 1315 may detect an occurrence of a trigger event for triggering a change in the MCS or resources to be used for transmitting the autonomous downlink transmissions or for monitoring the autonomous uplink transmissions. In some examples, the autonomous configuration transmitter 1310 may transmit an indication of the trigger event in the configuration.

The configuration adjustment component 1320 may adjust the MCS or resources to be used for transmitting the autonomous downlink transmissions or for monitoring the autonomous uplink transmissions in accordance with the configuration and based on the occurrence of the trigger event without informing the UE.

In some examples, the configuration adjustment component 1320 may autonomously decrease the MCS or increase the resources to be used for transmitting the autonomous downlink transmissions or for monitoring the autonomous uplink transmissions without informing the UE. Accordingly, the adjustment increase trigger component 1330 may identify that a retransmission of an autonomous uplink transmission or an autonomous downlink transmission occurred. In some examples, the adjustment increase trigger component 1330 may identify that a specific retransmission of an autonomous uplink transmission or an autonomous downlink transmission occurred. Additionally or alternatively, the adjustment increase trigger component 1330 may identify that a retransmission of an autonomous uplink transmission or an autonomous downlink transmission occurred during a specific window of time. In some cases, the specific window of time may be associated with a specific time duration beginning at a time of a slot on which a DCI message activating the autonomous uplink transmissions or autonomous downlink transmissions is transmitted. Additionally or alternatively, the adjustment increase trigger component 1330 may identify that a CSI measurement or an RRC measurement reported from the UE is below a threshold, where the threshold includes a predetermined threshold value or a threshold value indicated in the configuration.

Additionally or alternatively, the configuration adjustment component 1320 may autonomously increase the MCS or decrease the resources to be used for transmitting the autonomous downlink transmissions or for monitoring the autonomous uplink transmissions without informing the UE. Accordingly, the adjustment decrease trigger component 1335 may identify that a specific retransmission of an autonomous uplink transmission or an autonomous downlink transmission did not occur. In some examples, the adjustment decrease trigger component 1335 may identify that a retransmission of an autonomous uplink transmission or an autonomous downlink transmission did not occur during a specific window of time. In some cases, the specific window of time may be associated with a specific time duration beginning at a time of a slot on which a DCI message activating the autonomous uplink transmissions or autonomous downlink transmissions is transmitted. Additionally or alternatively, the adjustment decrease trigger component 1335 may identify that a CSI measurement or an RRC measurement reported from the UE is above a threshold, where the threshold includes a predetermined threshold value or a threshold value indicated in the configuration.

The adjusted configuration communicator 1325 may communicate with the UE using the adjusted MCS or resources. In some examples, the adjusted configuration communicator 1325 may communicate with the UE in accordance with the configuration.

The temporary configuration component 1340 may transmit a DCI message activating the temporary configuration as a temporary replacement to a baseline configuration, where the temporary configuration and the baseline configuration are separately configured and activated.

The MAC CE configuration transmitter 1345 may transmit at least a portion of the configuration via a MAC CE. In some examples, the MAC CE configuration transmitter 1345 may activate the configuration upon transmission of the MAC CE. Additionally or alternatively, the MAC CE configuration transmitter 1345 may transmit a DCI message subsequent to transmission of the MAC CE and may activate the configuration upon transmission of the DCI message. In some cases, the trigger event is included in the MAC CE, and portions of the configuration are included in both the MAC CE and the DCI message.

The DCI activation transmitter 1350 may transmit a DCI message subsequent to transmission of the MAC CE. In some examples, the DCI activation transmitter 1350 may activate the configuration upon transmission of the DCI message.

Figure 14:
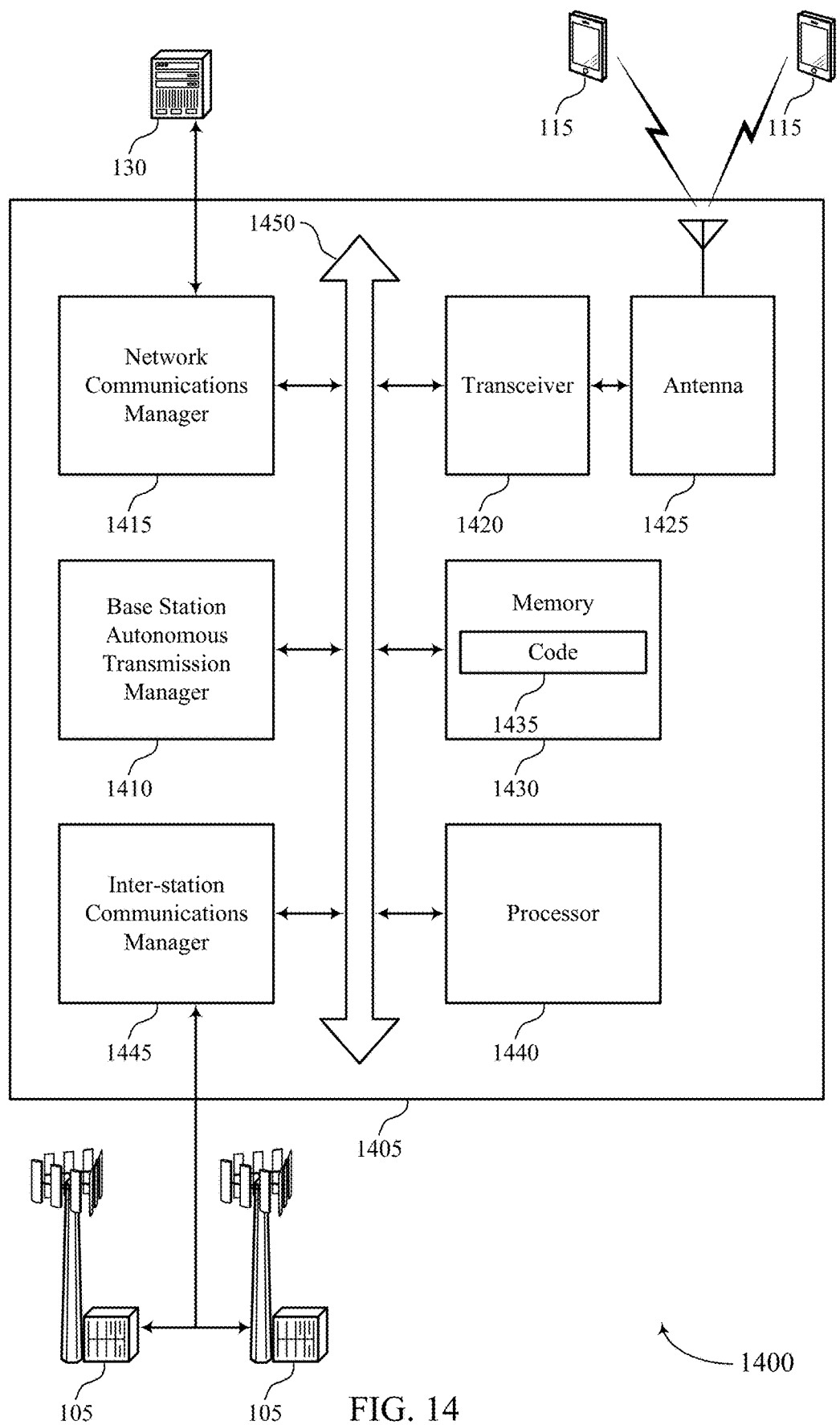
FIG. 14 shows a diagram of a system including a device that supports a self-adapting autonomous transmission configuration in accordance with aspects of the present disclosure.

FIG. 14 shows a diagram of a system 1400 including a device 1405 that supports a self-adapting autonomous transmission configuration in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a base station autonomous transmission manager 1410, a network communications manager 1415, a transceiver 1420, an antenna 1425, memory 1430, a processor 1440, and an inter-station communications manager 1445. These components may be in electronic communication via one or more buses (e.g., bus 1450).

The base station autonomous transmission manager 1410 may transmit, to a UE, a configuration that includes at least one of an MCS or resources for autonomous uplink transmissions from the UE to the base station or autonomous downlink transmissions from the base station to the UE. In some cases, the base station autonomous transmission manager 1410 may detect an occurrence of a trigger event for triggering a change in the MCS or resources to be used for transmitting the autonomous downlink transmissions or for monitoring the autonomous uplink transmissions. Accordingly, the base station autonomous transmission manager 1410 may adjust the MCS or resources to be used for transmitting the autonomous downlink transmissions or for monitoring the autonomous uplink transmissions in accordance with the configuration and based on the occurrence of the trigger event without informing the UE. The base station autonomous transmission manager 1410 may then communicate with the UE using the adjusted MCS or resources.

Additionally or alternatively, the base station autonomous transmission manager 1410 may also transmit, to a UE, a configuration for autonomous uplink transmissions from the UE to the base station or autonomous downlink transmissions from the base station to the UE, where the configuration is transmitted via a MAC CE and includes one or more of an indication of a set of RBs, a time offset, a periodicity, and an MCS. Accordingly, the base station autonomous transmission manager 1410 may communicate with the UE in accordance with the configuration.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a PLD, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device # {device} to perform various functions (e.g., functions or tasks supporting self-adapting autonomous transmission configuration).

The inter-station communications manager 1445 may manage communications with other base station 105 and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
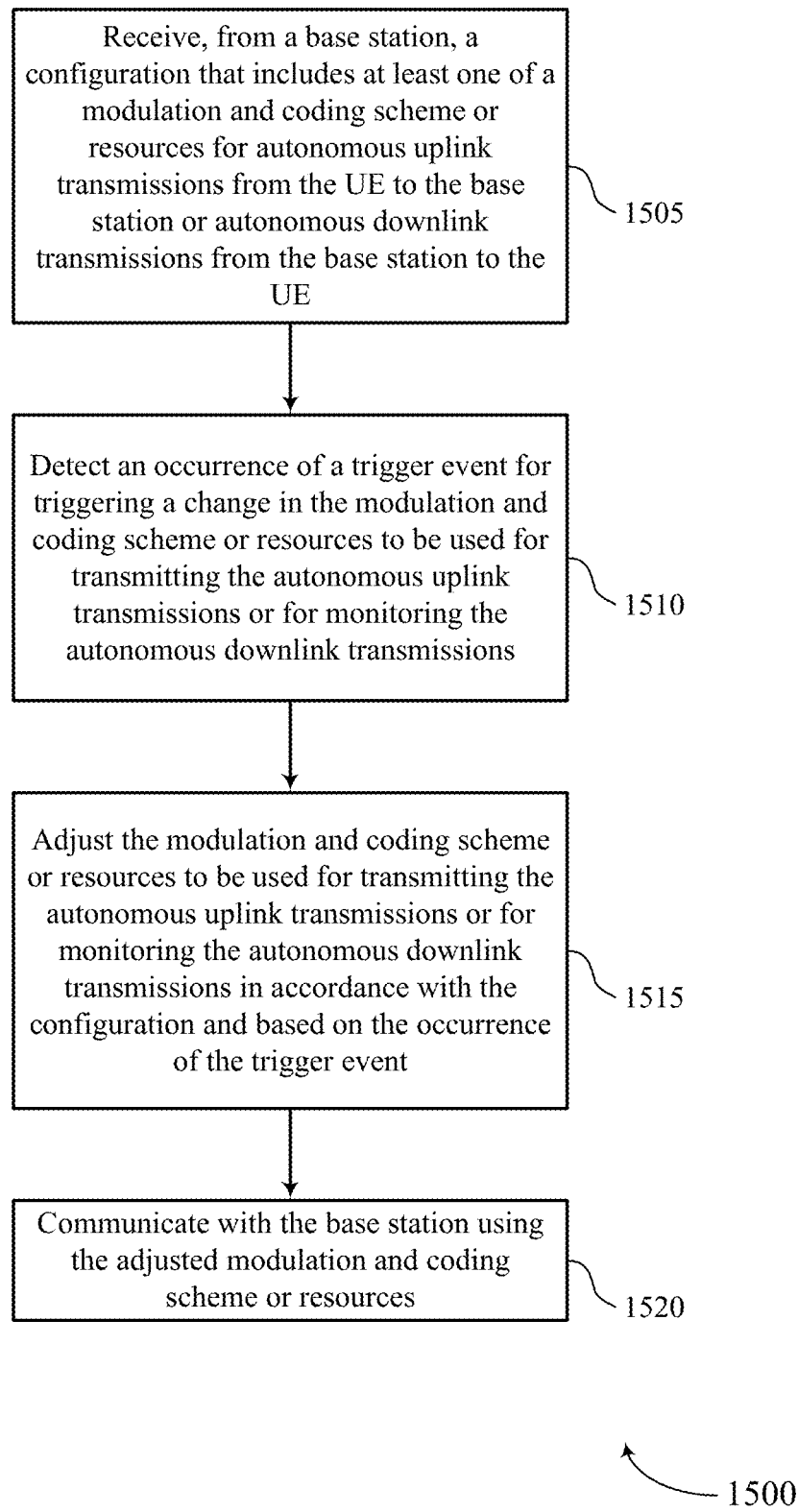
FIGS. 15 through 21 show flowcharts illustrating methods that support a self-adapting autonomous transmission configuration in accordance with aspects of the present disclosure.

FIG. 15 shows a flowchart illustrating a method 1500 that supports a self-adapting autonomous transmission configuration in accordance with aspects of the present disclosure. The operations of method 1500 may be implemented by a UE 115 or its components as described herein. For example, the operations of method 1500 may be performed by a UE autonomous transmission manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station, a configuration that includes at least one of an MCS or resources for autonomous uplink transmissions from the UE to the base station or autonomous downlink transmissions from the base station to the UE. The operations of 1505 may be performed according to the methods described herein. In some examples, aspects of the operations of 1505 may be performed by an autonomous configuration receiver as described with reference to FIGS. 7 through 10.

At 1510, the UE may detect an occurrence of a trigger event for triggering a change in the MCS or resources to be used for transmitting the autonomous uplink transmissions or for monitoring the autonomous downlink transmissions. The operations of 1510 may be performed according to the methods described herein. In some examples, aspects of the operations of 1510 may be performed by a self-adapting trigger component as described with reference to FIGS. 7 through 10.

At 1515, the UE may adjust the MCS or resources to be used for transmitting the autonomous uplink transmissions or for monitoring the autonomous downlink transmissions in accordance with the configuration and based on the occurrence of the trigger event. The operations of 1515 may be performed according to the methods described herein. In some examples, aspects of the operations of 1515 may be performed by a self-adapting component as described with reference to FIGS. 7 through 10.

At 1520, the UE may communicate with the base station using the adjusted MCS or resources. The operations of 1520 may be performed according to the methods described herein. In some examples, aspects of the operations of 1520 may be performed by a self-adapted autonomous communicator as described with reference to FIGS. 7 through 10.

Figure 16:
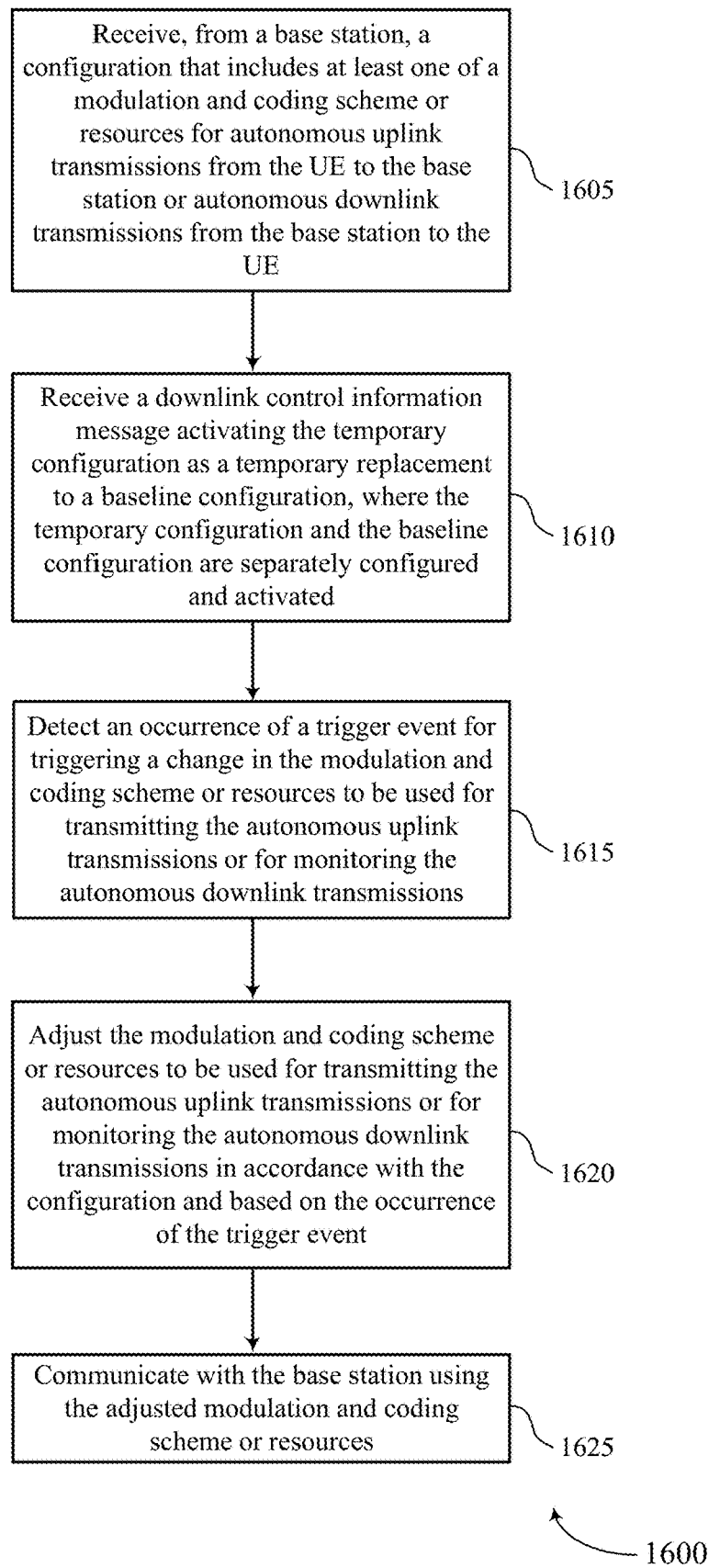

FIG. 16 shows a flowchart illustrating a method 1600 that supports a self-adapting autonomous transmission configuration in accordance with aspects of the present disclosure. The operations of method 1600 may be implemented by a UE 115 or its components as described herein. For example, the operations of method 1600 may be performed by a UE autonomous transmission manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may receive, from a base station, a configuration that includes at least one of an MCS or resources for autonomous uplink transmissions from the UE to the base station or autonomous downlink transmissions from the base station to the UE. The operations of 1605 may be performed according to the methods described herein. In some examples, aspects of the operations of 1605 may be performed by an autonomous configuration receiver as described with reference to FIGS. 7 through 10.

At 1610, the UE may receive a DCI message activating the temporary configuration as a temporary replacement to a baseline configuration, where the temporary configuration and the baseline configuration are separately configured and activated. The operations of 1610 may be performed according to the methods described herein. In some examples, aspects of the operations of 1610 may be performed by a temporary autonomous component as described with reference to FIGS. 7 through 10.

At 1615, the UE may detect an occurrence of a trigger event for triggering a change in the MCS or resources to be used for transmitting the autonomous uplink transmissions or for monitoring the autonomous downlink transmissions. The operations of 1615 may be performed according to the methods described herein. In some examples, aspects of the operations of 1615 may be performed by a self-adapting trigger component as described with reference to FIGS. 7 through 10.

At 1620, the UE may adjust the MCS or resources to be used for transmitting the autonomous uplink transmissions or for monitoring the autonomous downlink transmissions in accordance with the configuration and based on the occurrence of the trigger event. The operations of 1620 may be performed according to the methods described herein. In some examples, aspects of the operations of 1620 may be performed by a self-adapting component as described with reference to FIGS. 7 through 10.

At 1625, the UE may communicate with the base station using the adjusted MCS or resources. The operations of 1625 may be performed according to the methods described herein. In some examples, aspects of the operations of 1625 may be performed by a self-adapted autonomous communicator as described with reference to FIGS. 7 through 10.

Figure 17:
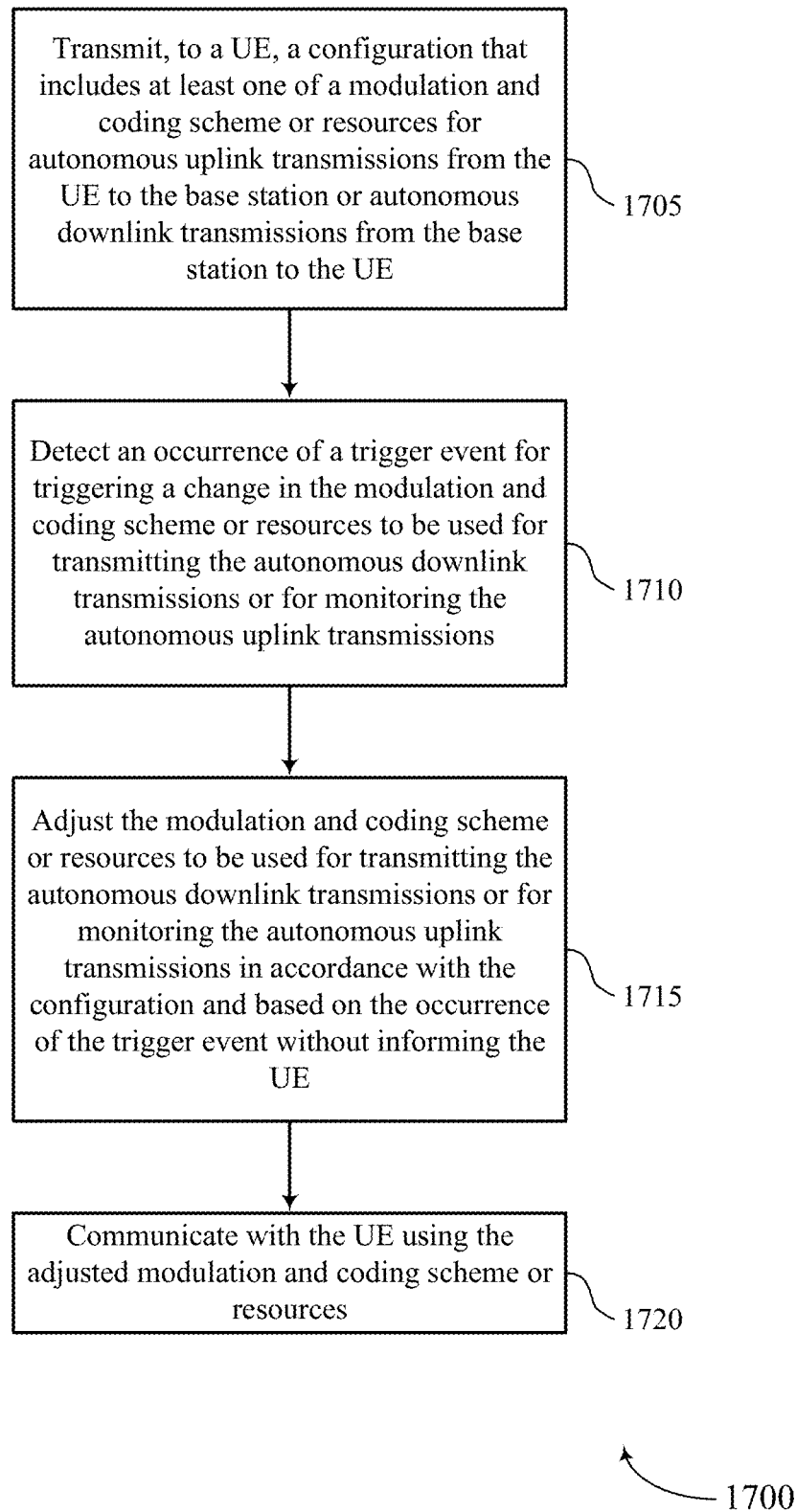

FIG. 17 shows a flowchart illustrating a method 1700 that supports a self-adapting autonomous transmission configuration in accordance with aspects of the present disclosure. The operations of method 1700 may be implemented by a base station 105 or its components as described herein. For example, the operations of method 1700 may be performed by a base station autonomous transmission manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1705, the base station may transmit, to a UE, a configuration that includes at least one of an MCS or resources for autonomous uplink transmissions from the UE to the base station or autonomous downlink transmissions from the base station to the UE. The operations of 1705 may be performed according to the methods described herein. In some examples, aspects of the operations of 1705 may be performed by an autonomous configuration transmitter as described with reference to FIGS. 11 through 14.

At 1710, the base station may detect an occurrence of a trigger event for triggering a change in the MCS or resources to be used for transmitting the autonomous downlink transmissions or for monitoring the autonomous uplink transmissions. The operations of 1710 may be performed according to the methods described herein. In some examples, aspects of the operations of 1710 may be performed by a configuration adjustment trigger component as described with reference to FIGS. 11 through 14.

At 1715, the base station may adjust the MCS or resources to be used for transmitting the autonomous downlink transmissions or for monitoring the autonomous uplink transmissions in accordance with the configuration and based on the occurrence of the trigger event without informing the UE. The operations of 1715 may be performed according to the methods described herein. In some examples, aspects of the operations of 1715 may be performed by a configuration adjustment component as described with reference to FIGS. 11 through 14.

At 1720, the base station may communicate with the UE using the adjusted MCS or resources. The operations of 1720 may be performed according to the methods described herein. In some examples, aspects of the operations of 1720 may be performed by an adjusted configuration communicator as described with reference to FIGS. 11 through 14.

Figure 18:
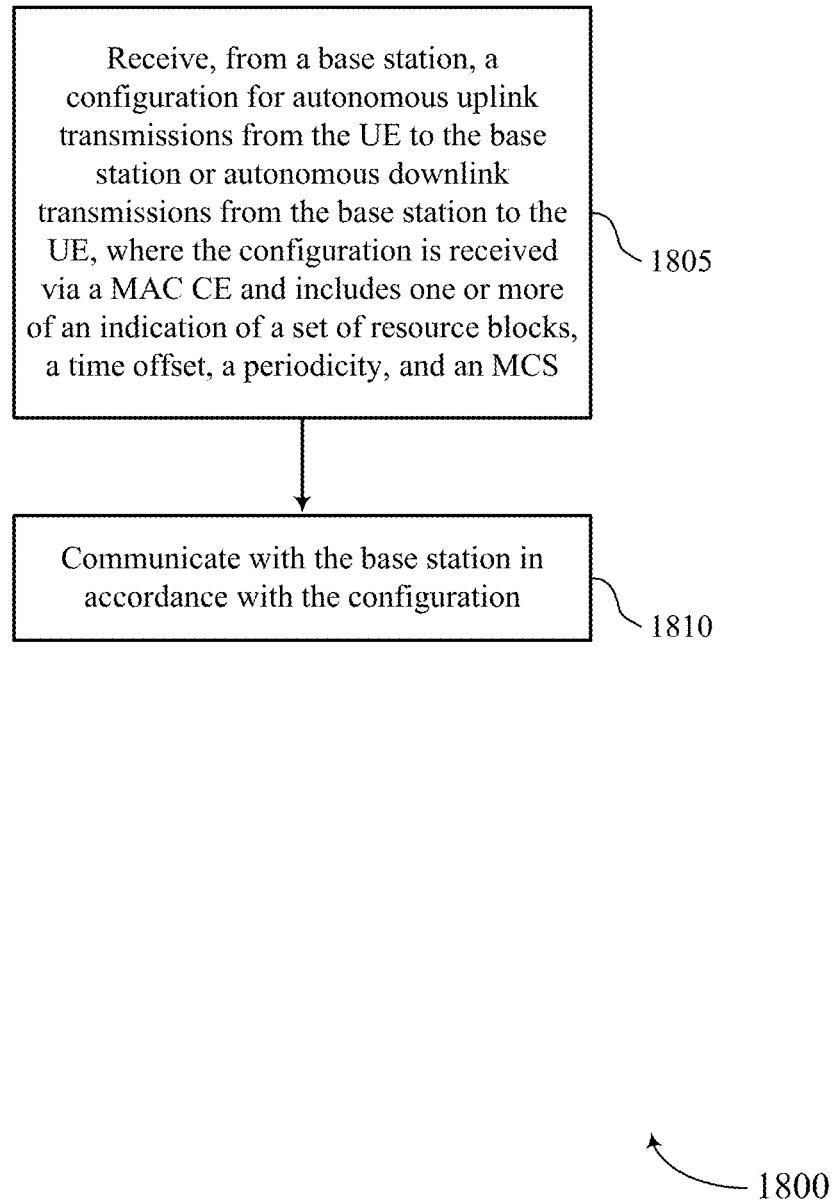

FIG. 18 shows a flowchart illustrating a method 1800 that supports a self-adapting autonomous transmission configuration in accordance with aspects of the present disclosure. The operations of method 1800 may be implemented by a UE 115 or its components as described herein. For example, the operations of method 1800 may be performed by a UE autonomous transmission manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1805, the UE may receive, from a base station, a configuration for autonomous uplink transmissions from the UE to the base station or autonomous downlink transmissions from the base station to the UE, where the configuration is received via a MAC CE and includes one or more of an indication of a set of RBs, a time offset, a periodicity, and an MCS. The operations of 1805 may be performed according to the methods described herein. In some examples, aspects of the operations of 1805 may be performed by an autonomous configuration receiver as described with reference to FIGS. 7 through 10.

At 1810, the UE may communicate with the base station in accordance with the configuration. The operations of 1810 may be performed according to the methods described herein. In some examples, aspects of the operations of 1810 may be performed by a self-adapted autonomous communicator as described with reference to FIGS. 7 through 10.

Figure 19:
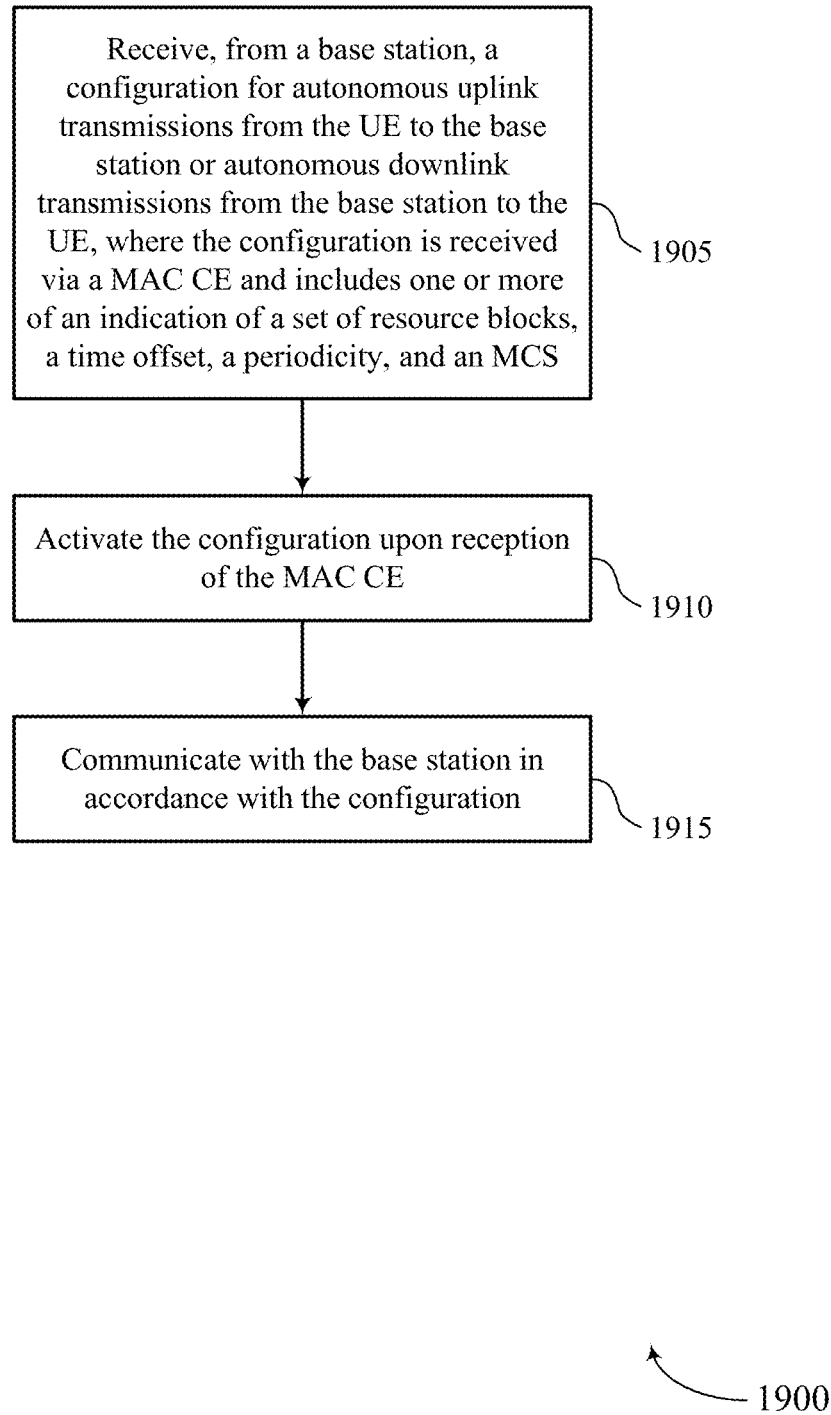

FIG. 19 shows a flowchart illustrating a method 1900 that supports a self-adapting autonomous transmission configuration in accordance with aspects of the present disclosure. The operations of method 1900 may be implemented by a UE 115 or its components as described herein. For example, the operations of method 1900 may be performed by a UE autonomous transmission manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1905, the UE may receive, from a base station, a configuration for autonomous uplink transmissions from the UE to the base station or autonomous downlink transmissions from the base station to the UE, where the configuration is received via a MAC CE and includes one or more of an indication of a set of RBs, a time offset, a periodicity, and an MCS. The operations of 1905 may be performed according to the methods described herein. In some examples, aspects of the operations of 1905 may be performed by an autonomous configuration receiver as described with reference to FIGS. 7 through 10.

At 1910, the UE may activate the configuration upon reception of the MAC CE. The operations of 1910 may be performed according to the methods described herein. In some examples, aspects of the operations of 1910 may be performed by a MAC CE configuration component as described with reference to FIGS. 7 through 10.

At 1915, the UE may communicate with the base station in accordance with the configuration. The operations of 1915 may be performed according to the methods described herein. In some examples, aspects of the operations of 1915 may be performed by a self-adapted autonomous communicator as described with reference to FIGS. 7 through 10.

Figure 20:
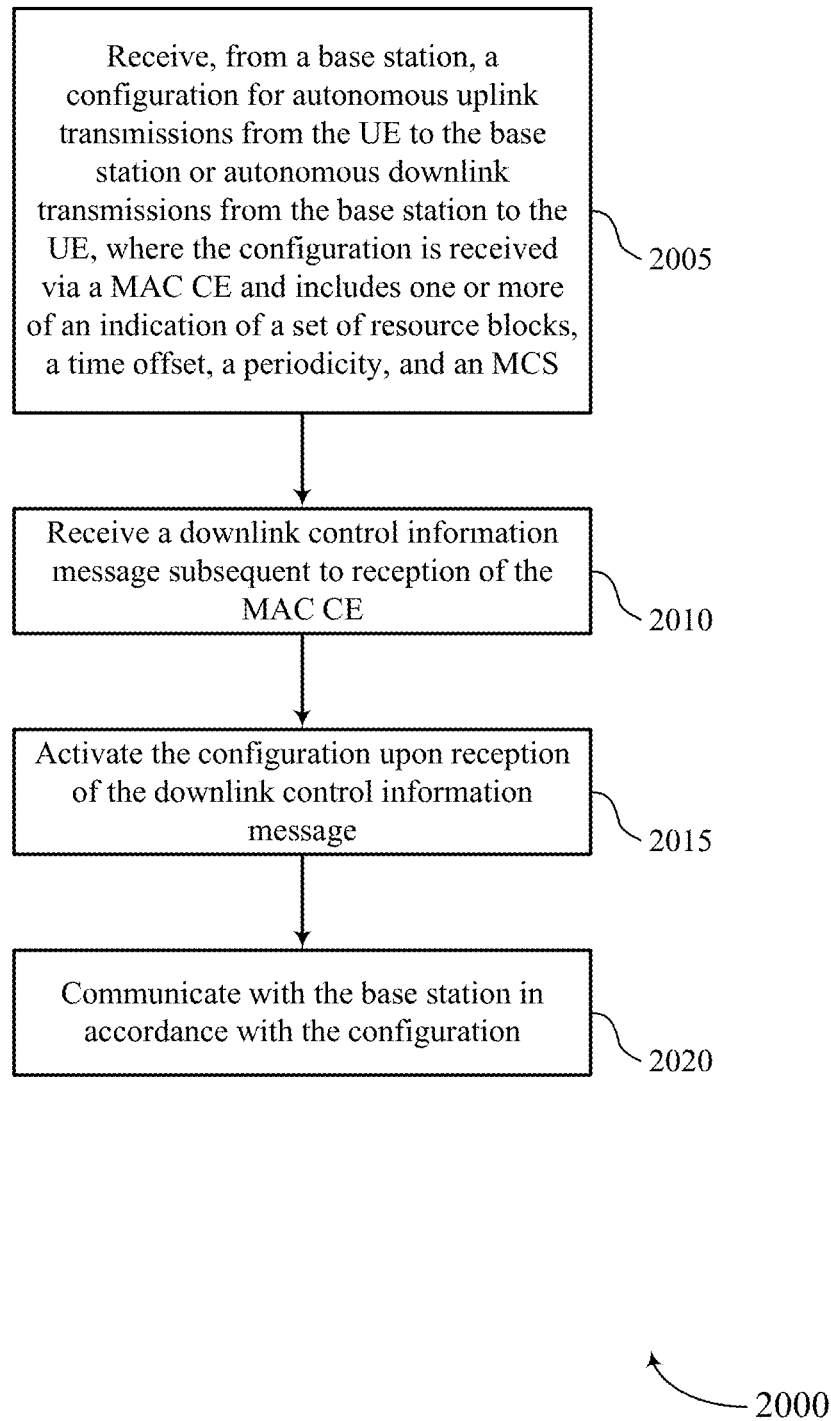

FIG. 20 shows a flowchart illustrating a method 2000 that supports a self-adapting autonomous transmission configuration in accordance with aspects of the present disclosure. The operations of method 2000 may be implemented by a UE 115 or its components as described herein. For example, the operations of method 2000 may be performed by a UE autonomous transmission manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 2005, the UE may receive, from a base station, a configuration for autonomous uplink transmissions from the UE to the base station or autonomous downlink transmissions from the base station to the UE, where the configuration is received via a MAC CE and includes one or more of an indication of a set of RBs, a time offset, a periodicity, and an MCS. The operations of 2005 may be performed according to the methods described herein. In some examples, aspects of the operations of 2005 may be performed by an autonomous configuration receiver as described with reference to FIGS. 7 through 10.

At 2010, the UE may receive a DCI message subsequent to reception of the MAC CE. The operations of 2010 may be performed according to the methods described herein. In some examples, aspects of the operations of 2010 may be performed by a DCI activation component as described with reference to FIGS. 7 through 10.

At 2015, the UE may activate the configuration upon reception of the DCI message. The operations of 2015 may be performed according to the methods described herein. In some examples, aspects of the operations of 2015 may be performed by a DCI activation component as described with reference to FIGS. 7 through 10.

At 2020, the UE may communicate with the base station in accordance with the configuration. The operations of 2020 may be performed according to the methods described herein. In some examples, aspects of the operations of 2020 may be performed by a self-adapted autonomous communicator as described with reference to FIGS. 7 through 10.

Figure 21:
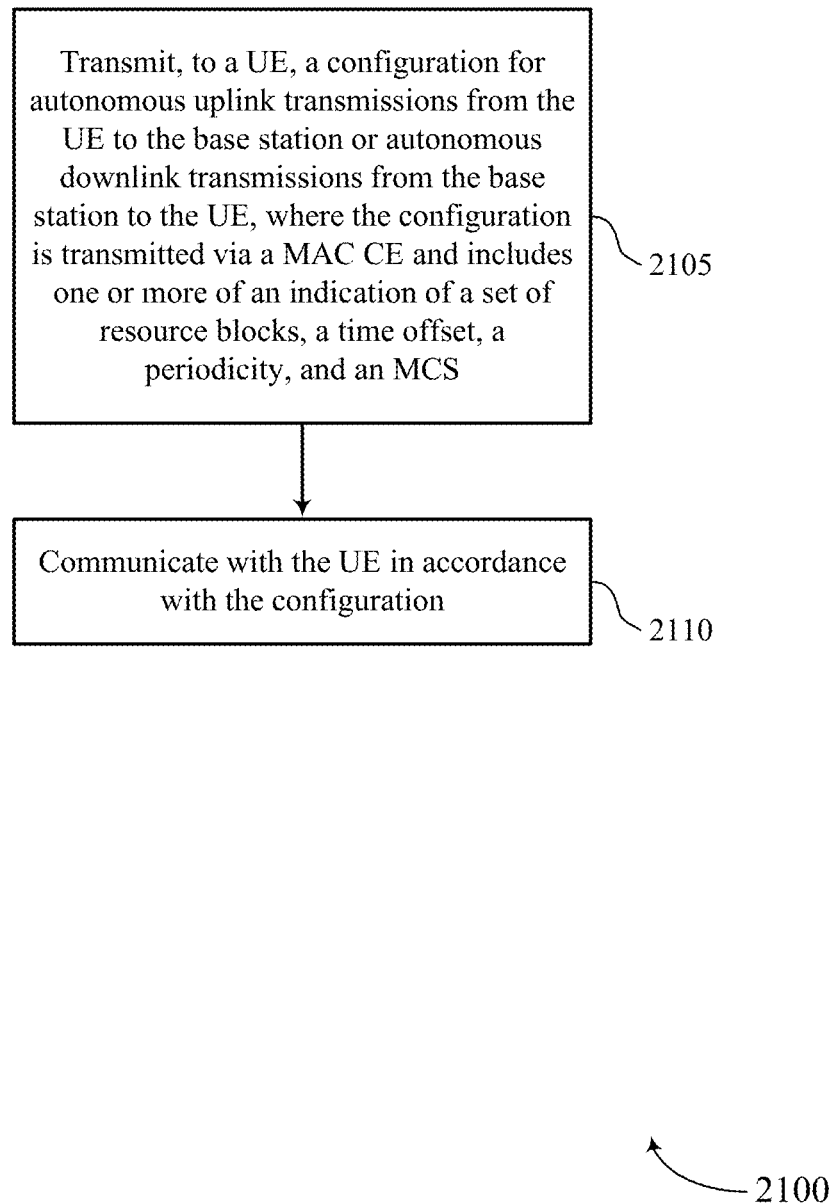

FIG. 21 shows a flowchart illustrating a method 2100 that supports a self-adapting autonomous transmission configuration in accordance with aspects of the present disclosure. The operations of method 2100 may be implemented by a base station 105 or its components as described herein. For example, the operations of method 2100 may be performed by a base station autonomous transmission manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2105, the base station may transmit, to a UE, a configuration for autonomous uplink transmissions from the UE to the base station or autonomous downlink transmissions from the base station to the UE, where the configuration is transmitted via a MAC CE and includes one or more of an indication of a set of RBs, a time offset, a periodicity, and an MCS. The operations of 2105 may be performed according to the methods described herein. In some examples, aspects of the operations of 2105 may be performed by an autonomous configuration transmitter as described with reference to FIGS. 11 through 14.

At 2110, the base station may communicate with the UE in accordance with the configuration. The operations of 2110 may be performed according to the methods described herein. In some examples, aspects of the operations of 2110 may be performed by an adjusted configuration communicator as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   a processor,
   memory in electronic communication with the processor; and
   instructions stored in the memory and executable by the processor to cause the apparatus to:
   receive, from a network entity, a configuration that includes at least one of a modulation and coding scheme or resources for autonomous uplink transmissions or autonomous downlink transmissions;
   receive, from the network entity, an indication of a window of time during which the UE monitors for occurrence of a trigger event that triggers autonomous adjustment of the configuration;
   detect the occurrence of the trigger event based at least in part on identifying that a retransmission of an autonomous uplink transmission or an autonomous downlink transmission occurred during the window of time;
   adjust the configuration based at least in part on detecting the occurrence of the trigger event during the indicated window of time, wherein adjusting the configuration comprises autonomously increasing or decreasing the modulation and coding scheme for the autonomous communications or the resources to be used for transmitting the autonomous uplink transmissions or for monitoring the autonomous downlink transmissions; and
   communicate with the network entity using the adjusted modulation and coding scheme or resources.

2. The apparatus of claim 1, wherein the instructions are executable by the processor to further cause the apparatus to:
   receive, from the network entity, an indication of one or more trigger events for autonomously changing the configuration, wherein the one or more trigger events comprise the retransmission of the autonomous uplink transmission or the autonomous downlink transmission.

3. The apparatus of claim 1, wherein the instructions to detect the occurrence of the trigger event are executable by the processor to cause the apparatus to:
   identify that a specific retransmission of the autonomous uplink transmission or the autonomous downlink transmission occurred.

4. The apparatus of claim 1, wherein the window of time is associated with a time duration beginning at a time of a slot on which a downlink control information message activating the autonomous uplink transmissions or autonomous downlink transmissions is received.

5. The apparatus of claim 1, wherein the instructions to detect the occurrence of the trigger event are executable by the processor to cause the apparatus to:
   identify that a channel state information measurement or a radio resource control measurement reported to the network entity is below a threshold, wherein the threshold comprises a predetermined threshold value or a threshold value indicated in the configuration.

6. The apparatus of claim 1, wherein the instructions to adjust the modulation and coding scheme or resources to be used for transmitting the autonomous uplink transmissions or for monitoring the autonomous downlink transmissions are executable by the processor to cause the apparatus to:
autonomously increase the modulation and coding scheme or decrease the resources to be used for transmitting the autonomous uplink transmissions or for monitoring the autonomous downlink transmissions.

7. The apparatus of claim 6, wherein the instructions to detect the occurrence of the trigger event are executable by the processor to cause the apparatus to:
identify that a specific retransmission of the autonomous uplink transmission or the autonomous downlink transmission did not occur.

8. The apparatus of claim 6, wherein the instructions to detect the occurrence of the trigger event are executable by the processor to cause the apparatus to:
identify that the retransmission of the autonomous uplink transmission or the autonomous downlink transmission did not occur during a specific window of time.

9. The apparatus of claim 8, wherein the specific window of time is associated with a specific time duration beginning at a time of a slot on which a downlink control information message activating the autonomous uplink transmissions or autonomous downlink transmissions is received.

10. The apparatus of claim 6, wherein the instructions to detect the occurrence of the trigger event are executable by the processor to cause the apparatus to:
identify that a channel state information measurement or a radio resource control measurement reported to the network entity is above a threshold, wherein the threshold comprises a predetermined threshold value or a threshold value indicated in the configuration.

11. The apparatus of claim 1, wherein the configuration is a temporary configuration, executable by the processor to cause the apparatus to:
receive a downlink control information message activating the temporary configuration as a temporary replacement to a baseline configuration, wherein the temporary configuration and the baseline configuration are separately configured and activated.

12. An apparatus for wireless communication at a network entity, comprising:
a processor,
memory in electronic communication with the processor; and
instructions stored in the memory and executable by the processor to cause the apparatus to:
transmit, to a user equipment (UE), a configuration that includes at least one of a modulation and coding scheme or resources for autonomous uplink transmissions or autonomous downlink transmissions;
transmit, to the UE, an indication of a window of time during which the UE monitors for occurrence of a trigger event that triggers autonomous adjustment of the configuration;
detect the occurrence of the trigger event based at least in part on identifying that a retransmission of an autonomous uplink transmission or an autonomous downlink transmission occurred during the window of time;
adjust the configuration based at least in part on detecting the occurrence of the trigger event during the indicated window of time, wherein adjusting the configuration comprises autonomously increasing or decreasing the modulation and coding scheme for the autonomous communications or the resources to be used for transmitting the autonomous uplink transmissions or for monitoring the autonomous downlink transmissions; and
communicate with the UE using the adjusted modulation and coding scheme or resources.

13. The apparatus of claim 12, wherein the instructions are executable by the processor to further cause the apparatus to:
transmit, to the UE, an indication of one or more trigger events for autonomously changing the configuration, wherein the one or more trigger events comprise the retransmission of the autonomous uplink transmission or the autonomous downlink transmission.

14. The apparatus of claim 12, wherein the instructions to detect the occurrence of the trigger event are executable by the processor to cause the apparatus to:
identify that a specific retransmission of the autonomous uplink transmission or the autonomous downlink transmission occurred.

15. The apparatus of claim 12, wherein the window of time is associated with a time duration beginning at a time of a slot on which a downlink control information message activating the autonomous uplink transmissions or autonomous downlink transmissions is received.

16. The apparatus of claim 12, wherein the instructions to detect the occurrence of the trigger event are executable by the processor to cause the apparatus to:
identify that a channel state information measurement or a radio resource control measurement reported to the network entity is below a threshold, wherein the threshold comprises a predetermined threshold value or a threshold value indicated in the configuration.

17. The apparatus of claim 12, wherein the instructions to adjust the modulation and coding scheme or resources to be used for transmitting the autonomous uplink transmissions or for monitoring the autonomous downlink transmissions are executable by the processor to cause the apparatus to:
autonomously increase the modulation and coding scheme or decrease the resources to be used for transmitting the autonomous uplink transmissions or for monitoring the autonomous downlink transmissions.

18. A method for wireless communication at a user equipment (UE), comprising:
receiving, from a network entity, a configuration that includes at least one of a modulation and coding scheme or resources for autonomous uplink transmissions or autonomous downlink transmissions;
receiving, from the network entity, an indication of a window of time during which the UE monitors for occurrence of a trigger event that triggers autonomous adjustment of the configuration;
detecting the occurrence of the trigger event based at least in part on identifying that a retransmission of an autonomous uplink transmission or an autonomous downlink transmission occurred during the window of time;
adjusting the configuration based at least in part on detecting the occurrence of the trigger event during the indicated window of time, wherein adjusting the configuration comprises autonomously increasing or decreasing the modulation and coding scheme for the autonomous communications or the resources to be used for transmitting the autonomous uplink transmissions or for monitoring the autonomous downlink transmissions; and
communicating with the network entity using the adjusted modulation and coding scheme or resources.

19. The method of claim 18, further comprising:
receiving, from the network entity, an indication of one or more trigger events for autonomously changing the configuration, wherein the one or more trigger events comprise the retransmission of the autonomous uplink transmission or the autonomous downlink transmission.

20. The method of claim 18, wherein detecting the occurrence of the trigger event comprises:
identifying that a specific retransmission of the autonomous uplink transmission or the autonomous downlink transmission occurred.

\* \* \* \* \*